US011727223B2

(12) United States Patent
Osterhout

(10) Patent No.: US 11,727,223 B2
(45) **Date of Patent: *Aug. 15, 2023**

(54) LANGUAGE TRANSLATION WITH HEAD-WORN COMPUTING

(71) Applicant: Mentor Acquisition One, LLC, Plantation, FL (US)

(72) Inventor: Ralph F. Osterhout, San Francisco, CA (US)

(73) Assignee: Mentor Acquisition One, LLC, Plantation, FL (US)

(*) Notice: Subject to any disclaimer, the term of this patent is extended or adjusted under 35 U.S.C. 154(b) by 228 days.

This patent is subject to a terminal disclaimer.

(21) Appl. No.: 17/083,228

(22) Filed: Oct. 28, 2020

(65) Prior Publication Data

US 2021/0165975 A1 Jun. 3, 2021

Related U.S. Application Data

(63) Continuation of application No. 16/149,405, filed on Oct. 2, 2018, now Pat. No. 10,853,589, which is a continuation of application No. 15/494,827, filed on Apr. 24, 2017, now Pat. No. 10,146,772, which is a continuation of application No. 14/659,815, filed on Mar. 17, 2015, now Pat. No. 9,672,210, which is a continuation-in-part of application No. 14/490,586, filed on Sep. 18, 2014, now Pat. No. 9,423,842, which is a continuation-in-part of application No. 14/307,465, filed on Jun. 17, 2014, now Pat. No. 9,651,787.

(51) Int. Cl.

*G06F 40/58* (2020.01)
*G02B 27/01* (2006.01)

(52) U.S. Cl.

CPC ........... *G06F 40/58* (2020.01); *G02B 27/017* (2013.01); *G02B 27/0176* (2013.01); *G02B 2027/0156* (2013.01); *G02B 2027/0178* (2013.01)

(58) Field of Classification Search

CPC . G06F 17/289; G02B 27/0176; G02B 27/017; G02B 2027/0156; G02B 2027/0178

See application file for complete search history.

(56) References Cited

U.S. PATENT DOCUMENTS

| | | | |
|---|---|---|---|
| 1,014,672 | A | 1/1912 | Snook |
| 1,897,833 | A | 2/1933 | Benway |
| 2,064,604 | A | 12/1936 | Paul |
| 3,305,294 | A | 2/1967 | Alvarez |
| 3,531,190 | A | 9/1970 | Leblanc |
| 3,671,111 | A | 6/1972 | Okner |
| 4,034,401 | A | 7/1977 | Mann |
| 4,145,125 | A | 3/1979 | Chika |

(Continued)

FOREIGN PATENT DOCUMENTS

| | | | |
|---|---|---|---|
| CA | 2316473 | A1 | 1/2001 |
| CA | 2362895 | A1 | 12/2002 |

(Continued)

OTHER PUBLICATIONS

US 8,743,465 B2, 06/2014, Totani (withdrawn)

(Continued)

*Primary Examiner* — Jack Dinh

(74) *Attorney, Agent, or Firm* — Morrison & Foerster LLP

(57) ABSTRACT

Aspects of the present invention relate to language translation systems for head-worn computers.

13 Claims, 11 Drawing Sheets

Magnetic Earbuds 802
102
Magnetic Speaker 804
102
102
808
Internal Speaker
(piezo or speaker)

(56) References Cited

U.S. PATENT DOCUMENTS 4,513,812 A 4/1985 Papst
4,668,155 A 5/1987 Kaufmann
4,695,129 A 9/1987 Faessen
4,788,535 A 11/1988 Chikara
4,811,739 A 3/1989 Silver
4,852,988 A 8/1989 Veiez
4,928,301 A 5/1990 Smoot
D327,674 S 7/1992 Kuo
5,151,722 A 9/1992 Massof
5,257,094 A 10/1993 Larussa
D352,930 S 11/1994 Tsuji
5,483,307 A 1/1996 Anderson
D375,748 S 11/1996 Hartman
D376,790 S 12/1996 Taylor
5,596,451 A 1/1997 Handschy
5,621,424 A 4/1997 Shimada
5,625,372 A 4/1997 Hildebrand
5,699,057 A 12/1997 Ikeda
5,699,194 A 12/1997 Takahashi
5,717,422 A 2/1998 Fergason
D392,959 S 3/1998 Edwards
5,729,242 A 3/1998 Margerum
5,767,841 A 6/1998 Hartman
5,788,195 A 8/1998 Rice
5,808,589 A 9/1998 Fergason
5,808,800 A 9/1998 Handschy
5,808,802 A 9/1998 Hur
D410,638 S 6/1999 Loughnane
5,914,818 A 6/1999 Tejada
5,949,583 A 9/1999 Rallison
5,954,642 A 9/1999 Johnson
5,971,538 A 10/1999 Heffner
5,991,084 A 11/1999 Hildebrand
6,028,608 A 2/2000 Jenkins
6,034,653 A 3/2000 Robertson
6,046,712 A 4/2000 Beller
6,137,675 A 10/2000 Perkins
6,147,805 A 11/2000 Fergason
6,157,291 A 12/2000 Kuenster
6,160,552 A 12/2000 Wilsher
6,160,666 A 12/2000 Rallison
6,195,136 B1 2/2001 Handschy
6,204,974 B1 3/2001 Spitzer
6,222,677 B1 4/2001 Budd
6,297,749 B1 10/2001 Smith
D451,892 S 12/2001 Carrere
6,347,764 B1 2/2002 Brandon
6,359,723 B1 3/2002 Handschy
6,369,952 B1 4/2002 Rallison
6,379,009 B1 4/2002 Fergason
6,384,982 B1 5/2002 Spitzer
6,392,656 B1 5/2002 Someya
D460,071 S 7/2002 Sheehan
6,421,031 B1 7/2002 Ronzani
6,433,760 B1 8/2002 Vaissie
6,456,438 B1 9/2002 Lee
6,461,000 B1 10/2002 Magarill
6,478,429 B1 11/2002 Aritake
6,480,174 B1 11/2002 Kaufmann
6,491,389 B2 12/2002 Yaguchi
6,491,391 B1 12/2002 Blum et al.
D470,144 S 2/2003 Li
6,535,182 B2 3/2003 Stanton
D473,871 S 4/2003 Santos
6,563,626 B1 5/2003 Iwasaki
D478,052 S 8/2003 Thomas, Jr.
6,642,945 B1 11/2003 Sharpe
6,747,611 B1 6/2004 Budd
6,771,294 B1 8/2004 Pulli
6,795,041 B2 9/2004 Ogawa
6,847,336 B1 1/2005 Lemelson
6,906,836 B2 6/2005 Parker
6,943,754 B2 9/2005 Aughey
D512,027 S 11/2005 Sarasjoki
D513,233 S 12/2005 Stauffer
6,977,776 B2 12/2005 Voikenandt et al.
6,987,787 B1 1/2006 Mick
D514,525 S 2/2006 Stauffer
7,003,308 B1 2/2006 Fuoss
7,016,116 B2 3/2006 Dolgoff
7,030,925 B1 4/2006 Tsunekawa
D521,493 S 5/2006 Wai
7,088,234 B2 8/2006 Naito
D529,467 S 10/2006 Rose
D541,226 S 4/2007 Wakisaka
7,199,934 B2 4/2007 Yamasaki
7,206,134 B2 4/2007 Weissman
D559,793 S 1/2008 Fan
7,347,551 B2 3/2008 Fergason et al.
D571,816 S 6/2008 Corcoran
7,380,936 B2 6/2008 Howell
7,401,918 B2 7/2008 Howell
7,414,791 B2 8/2008 Urakawa
7,417,617 B2 8/2008 Eichenlaub
7,457,040 B2 11/2008 Amitai
7,481,531 B2 1/2009 Howell
7,488,294 B2 2/2009 Torch
7,500,747 B2 3/2009 Howell
7,522,344 B1 4/2009 Curatu
7,542,210 B2 6/2009 Chirieleison, Sr.
7,543,943 B1 6/2009 Hubby, Jr.
7,582,828 B2 9/2009 Ryan
7,646,540 B2 1/2010 Dolgoff
7,677,723 B2 3/2010 Howell
7,690,799 B2 4/2010 Nestorovic
7,728,799 B2 6/2010 Kerr
7,733,571 B1 6/2010 Li
7,758,185 B2 7/2010 Lewis
7,771,046 B2 8/2010 Howell
7,777,690 B2 8/2010 Winsor
7,777,723 B2 8/2010 Namiki
7,777,960 B2 8/2010 Freeman
7,791,889 B2 9/2010 Belady
7,792,552 B2 9/2010 Thomas
7,806,525 B2 10/2010 Howell
7,812,842 B2 10/2010 Gordon
7,813,743 B1 10/2010 Loeb
7,830,370 B2 11/2010 Yamazaki
7,850,301 B2 12/2010 Dichiara
7,855,743 B2 12/2010 Sako
D631,881 S 2/2011 Quinn
D631,882 S 2/2011 Odgers
7,928,926 B2 4/2011 Yamamoto
8,004,765 B2 8/2011 Amitai
8,018,579 B1 9/2011 Krah
8,079,713 B2 12/2011 Ashkenazi
8,089,568 B1 1/2012 Brown
8,092,007 B2 1/2012 Dichiara
8,166,421 B2 4/2012 Magal
8,212,859 B2 7/2012 Tang
8,228,315 B1 7/2012 Starner
8,235,529 B1 8/2012 Raffle
8,246,170 B2 8/2012 Yamamoto
D669,066 S 10/2012 Olsson
8,337,013 B2 12/2012 Howell
8,353,594 B2 1/2013 Lewis
8,376,548 B2 2/2013 Schultz
8,378,924 B2 2/2013 Jacobsen
8,384,999 B1 2/2013 Crosby
D680,112 S 4/2013 Monahan
D680,152 S 4/2013 Olsson
8,427,396 B1 4/2013 Kim
8,430,507 B2 4/2013 Howell
8,434,863 B2 5/2013 Howell
D685,019 S 6/2013 Li
8,467,133 B2 6/2013 Miller
8,472,120 B2 6/2013 Border
8,473,241 B2 6/2013 Foxlin
8,477,425 B2 7/2013 Border
8,482,859 B2 7/2013 Border
8,487,838 B2 7/2013 Lewis
8,488,246 B2 7/2013 Border
8,489,326 B1 7/2013 Na
8,494,215 B2 7/2013 Kimchi

(56) References Cited

U.S. PATENT DOCUMENTS 8,505,430 B2 8/2013 Miralles
D689,862 S 9/2013 Liu
8,531,394 B2 9/2013 Maltz
D690,684 S 10/2013 Lee
8,553,910 B1 10/2013 Dong
8,564,883 B2 10/2013 Totani
8,570,273 B1 10/2013 Smith
8,570,656 B1 10/2013 Weissman
8,576,276 B2 11/2013 Bar-zeev
8,576,491 B2 11/2013 Takagi
8,587,869 B2 11/2013 Totani
8,593,795 B1 11/2013 Chi
8,594,467 B2 11/2013 Lu
D696,668 S 12/2013 Chen
8,611,015 B2 12/2013 Wheeler
8,638,498 B2 1/2014 Bohn et al.
8,662,686 B2 3/2014 Takagi
8,665,214 B2 3/2014 Forutanpour
8,670,183 B2 3/2014 Clavin
8,678,581 B2 3/2014 Blum
8,696,113 B2 4/2014 Lewis
8,698,157 B2 4/2014 Hanamura
8,711,487 B2 4/2014 Takeda
8,730,129 B2 5/2014 Solomon
8,733,927 B1 5/2014 Lewis
8,733,928 B1 5/2014 Lewis
8,743,052 B1 6/2014 Keller
8,745,058 B1 6/2014 Garcia-barrio
8,750,541 B1 6/2014 Dong
8,752,963 B2 6/2014 Mcculloch
8,760,765 B2 6/2014 Gupta
8,767,306 B1 7/2014 Miao
8,770,742 B2 7/2014 Howell
8,786,675 B2 7/2014 Deering
8,786,686 B1 7/2014 Amirparviz
8,787,006 B2 7/2014 Golko
8,803,867 B2 8/2014 Oikawa
8,814,691 B2 8/2014 Haddick
8,823,071 B2 9/2014 Oyamada
8,824,779 B1 9/2014 Smyth
8,832,557 B2 9/2014 Fadell
8,836,768 B1 9/2014 Rafii
8,837,880 B2 9/2014 Takeda
8,854,433 B1 10/2014 Rafii
8,854,735 B2 10/2014 Totani
8,866,702 B1 10/2014 Wong
8,866,849 B1 10/2014 Cho
8,867,139 B2 10/2014 Gupta
D716,808 S 11/2014 Yeom
D716,813 S 11/2014 Deng
8,878,749 B1 11/2014 Wu
D719,568 S 12/2014 Heinrich
D719,569 S 12/2014 Heinrich
D719,570 S 12/2014 Heinrich
8,922,530 B2 12/2014 Pance
8,929,589 B2 1/2015 Publicover et al.
8,947,323 B1 2/2015 Raffle
8,948,935 B1 2/2015 Peeters
8,955,973 B2 2/2015 Raffle
8,957,835 B2 2/2015 Hoellwarth
8,964,298 B2 2/2015 Haddick
D724,083 S 3/2015 Olsson
8,970,495 B1 3/2015 Biffle
8,971,023 B2 3/2015 Olsson
8,982,014 B2 3/2015 Evans
8,982,471 B1 3/2015 Starner
D727,317 S 4/2015 Olsson
9,010,929 B2 4/2015 Lewis
9,020,832 B2 4/2015 Fisher
D728,573 S 5/2015 Deng
9,024,842 B1 5/2015 Prada Gomez
9,031,273 B2 5/2015 Dong
9,033,502 B2 5/2015 Nistico
D732,025 S 6/2015 Heinrich
9,046,686 B2 6/2015 Saito
9,046,999 B1 6/2015 Teller
9,063,563 B1 6/2015 Gray
D733,709 S 7/2015 Kawai
9,076,368 B2 7/2015 Evans
9,096,920 B1 8/2015 Gomez
9,105,261 B2 8/2015 Horii
9,107,622 B2 8/2015 Nistico
9,116,337 B1 8/2015 Miao
D738,373 S 9/2015 Davies
9,122,054 B2 9/2015 Osterhout
9,128,281 B2 9/2015 Osterhout
9,129,157 B2 9/2015 Chao
9,129,295 B2 9/2015 Border
9,143,693 B1 9/2015 Zhou
9,158,115 B1 10/2015 Worley
9,158,116 B1 10/2015 Osterhout
D743,963 S 11/2015 Osterhout
9,176,582 B1 11/2015 Johnson
D745,007 S 12/2015 Cazalet
9,202,233 B1 12/2015 Siegel
9,225,934 B2 12/2015 Cho
9,229,233 B2 1/2016 Osterhout
9,229,234 B2 1/2016 Osterhout
9,235,051 B2 1/2016 Salter
9,235,064 B2 1/2016 Lewis
9,239,473 B2 1/2016 Lewis
9,244,293 B2 1/2016 Lewis
9,269,193 B2 2/2016 Saito
D751,551 S 3/2016 Ho
D751,552 S 3/2016 Osterhout
9,274,338 B2 3/2016 Robbins et al.
9,286,728 B2 3/2016 Osterhout
9,292,973 B2 3/2016 Bar-zeev et al.
9,298,001 B2 3/2016 Border
9,298,002 B2 3/2016 Border
9,298,007 B2 3/2016 Border
9,299,194 B2 3/2016 Border
D753,114 S 4/2016 Osterhout
9,310,610 B2 4/2016 Border
9,316,833 B2 4/2016 Border
D756,363 S 5/2016 Mathis
D757,006 S 5/2016 Cazalet
9,329,387 B2 5/2016 Border
9,354,445 B1 5/2016 Weaver
9,366,867 B2 6/2016 Border
9,366,868 B2 6/2016 Border
9,377,625 B2 6/2016 Border
9,400,233 B2 7/2016 Lin
9,400,390 B2 7/2016 Osterhout
9,401,540 B2 7/2016 Osterhout
9,423,612 B2 8/2016 Border
9,423,842 B2 8/2016 Osterhout
9,436,006 B2 9/2016 Border
9,448,409 B2 9/2016 Border
9,494,800 B2 11/2016 Border
9,523,856 B2 12/2016 Osterhout
9,529,195 B2 12/2016 Osterhout
9,529,199 B2 12/2016 Osterhout
9,651,787 B2 5/2017 Haddick
9,651,788 B2 5/2017 Osterhout
9,651,789 B2 5/2017 Osterhout
9,658,473 B2 5/2017 Lewis
9,672,210 B2 6/2017 Osterhout
9,684,172 B2 6/2017 Border
D792,400 S 7/2017 Osterhout
9,720,505 B2 8/2017 Gribetz et al.
9,746,676 B2 8/2017 Osterhout
9,846,308 B2 12/2017 Osterhout
10,013,053 B2 7/2018 Cederlund et al.
10,025,379 B2 7/2018 Drake et al.
10,151,937 B2 12/2018 Lewis
10,185,147 B2 1/2019 Lewis
10,853,589 B2 12/2020 Osterhout
2001/0019240 A1 9/2001 Takahashi
2001/0050817 A1 12/2001 Travers
2002/0005108 A1 1/2002 Ludwig
2002/0021498 A1 2/2002 Ohtaka
2002/0054272 A1 5/2002 Ebata
2002/0085843 A1 7/2002 Mann

(56) References Cited

U.S. PATENT DOCUMENTS

2002/0109903 A1 8/2002 Kaeriyama
2002/0148655 A1 10/2002 Cho
2002/0149545 A1 10/2002 Hanayama
2002/0183101 A1 12/2002 Oh
2002/0191297 A1 12/2002 Gleckman
2003/0030597 A1 2/2003 Geist
2003/0030912 A1 2/2003 Gleckman
2003/0151834 A1 8/2003 Penn
2003/0209953 A1 11/2003 Park
2003/0234823 A1 12/2003 Sato
2004/0008158 A1 1/2004 Chi
2004/0024287 A1 2/2004 Patton
2004/0027312 A1 2/2004 Owada
2004/0030448 A1 2/2004 Solomon
2004/0032392 A1 2/2004 Chi
2004/0066363 A1 4/2004 Yamano
2004/0066547 A1 4/2004 Parker
2004/0080541 A1 4/2004 Saiga
2004/0130522 A1 7/2004 Lin
2004/0132509 A1 7/2004 Glezerman
2004/0150631 A1 8/2004 Fleck
2004/0194880 A1 10/2004 Jiang
2004/0227994 A1 11/2004 Bruzzone
2005/0010091 A1 1/2005 Woods
2005/0010563 A1 1/2005 Gross
2005/0041289 A1 2/2005 Berman
2005/0122319 A1 6/2005 Sakurai
2005/0154505 A1 7/2005 Nakamura
2005/0156915 A1 7/2005 Fisher
2005/0157949 A1 7/2005 Aiso
2005/0212980 A1 9/2005 Miyazaki
2005/0264752 A1 12/2005 Howell
2006/0023158 A1 2/2006 Howell et al.
2006/0047386 A1 3/2006 Kanevsky
2006/0050146 A1 3/2006 Richardson
2006/0061542 A1 3/2006 Stokic
2006/0092131 A1 5/2006 Kuroki
2006/0098293 A1 5/2006 Garoutte
2006/0119794 A1 6/2006 Hillis
2006/0132457 A1 6/2006 Rimas-ribikauskas
2006/0132924 A1 6/2006 Mimran
2006/0152686 A1 7/2006 Yeralan
2006/0170652 A1 8/2006 Bannai
2006/0173351 A1 8/2006 Marcotte
2006/0178827 A1 8/2006 Aoyama
2006/0215111 A1 9/2006 Mihashi
2006/0224238 A1 10/2006 Azar
2006/0238550 A1 10/2006 Page
2006/0239629 A1 10/2006 Qi
2006/0250322 A1 11/2006 Hall
2006/0250696 A1 11/2006 Mcguire
2006/0285315 A1 12/2006 Tufenkjian
2006/0288233 A1 12/2006 Kozlay
2007/0003168 A1 1/2007 Oliver
2007/0004451 A1 1/2007 C.
2007/0024750 A1 2/2007 Wing
2007/0024763 A1 2/2007 Chung
2007/0024764 A1 2/2007 Chung
2007/0024820 A1 2/2007 Chung
2007/0024823 A1 2/2007 Chung
2007/0025273 A1 2/2007 Chung
2007/0030243 A1 2/2007 Ishii
2007/0030456 A1 2/2007 Duncan
2007/0035563 A1 2/2007 Biocca
2007/0038960 A1 2/2007 Rekimoto
2007/0058868 A1 3/2007 Seino
2007/0069976 A1 3/2007 Willins
2007/0070859 A1 3/2007 Hirayama
2007/0100637 A1 5/2007 Mccune
2007/0109284 A1 5/2007 Yamazaki
2007/0120806 A1 5/2007 Schmidt
2007/0120836 A1 5/2007 Yamaguchi
2007/0132662 A1 6/2007 Morita
2007/0178950 A1 8/2007 Lewis
2007/0233376 A1 10/2007 Gershony
2007/0263174 A1 11/2007 Cheng
2007/0273611 A1 11/2007 Torch
2007/0282682 A1 12/2007 Dietz
2007/0296684 A1 12/2007 Thomas
2008/0005702 A1 1/2008 Skourup
2008/0066973 A1 3/2008 Furuki
2008/0121441 A1 5/2008 Sheets
2008/0122736 A1 5/2008 Ronzani
2008/0125288 A1 5/2008 Case
2008/0143954 A1 6/2008 Abreu
2008/0169998 A1 7/2008 Jacobsen
2008/0186255 A1 8/2008 Cohen
2008/0191965 A1 8/2008 Pandozy
2008/0219025 A1 9/2008 Spitzer
2008/0266645 A1 10/2008 Dharmatilleke
2008/0291277 A1 11/2008 Jacobsen
2008/0298639 A1 12/2008 Tsunekawa
2009/0013204 A1 1/2009 Kobayashi
2009/0015735 A1 1/2009 Simmonds
2009/0040296 A1 2/2009 Moscato
2009/0108837 A1 4/2009 Johansson
2009/0110241 A1 4/2009 Takemoto
2009/0147331 A1 6/2009 Ashkenazi
2009/0183929 A1 7/2009 Zhang
2009/0251441 A1 10/2009 Edgecomb
2009/0279180 A1 11/2009 Amitai
2010/0001572 A1 1/2010 Masunaga
2010/0007852 A1 1/2010 Bietry
2010/0045928 A1 2/2010 Levy
2010/0046075 A1 2/2010 Powell
2010/0056274 A1 3/2010 Uusitalo
2010/0060713 A1 3/2010 Snyder
2010/0073376 A1 3/2010 Schmale
2010/0079356 A1 4/2010 Hoellwarth
2010/0079508 A1 4/2010 Hodge
2010/0079733 A1 4/2010 Lu
2010/0082368 A1 4/2010 Gecelter
2010/0085325 A1 4/2010 King-smith
2010/0094161 A1 4/2010 Kiderman
2010/0097580 A1 4/2010 Yamamoto
2010/0103075 A1 4/2010 Kalaboukis
2010/0113062 A1 5/2010 Lee
2010/0130140 A1 5/2010 Waku
2010/0149073 A1 6/2010 Chaum
2010/0178101 A1 7/2010 Day
2010/0194682 A1 8/2010 Orr
2010/0240988 A1 9/2010 Varga
2010/0241450 A1 9/2010 Gierhart
2010/0253594 A1 10/2010 Szczerba
2010/0254017 A1 10/2010 Martins
2010/0280904 A1 11/2010 Ahuja
2010/0283774 A1 11/2010 Bovet
2010/0290127 A1 11/2010 Kessler
2010/0309426 A1 12/2010 Howell
2010/0329301 A1 12/2010 Pang
2011/0006982 A1 1/2011 Rhee
2011/0007081 A1 1/2011 Gordon
2011/0012874 A1 1/2011 Kurozuka
2011/0089325 A1 4/2011 Ottney
2011/0096100 A1 4/2011 Sprague
2011/0102234 A1 5/2011 Adams
2011/0130958 A1 6/2011 Stahl
2011/0131495 A1 6/2011 Bull
2011/0157236 A1 6/2011 Inoue
2011/0159931 A1 6/2011 Boss
2011/0164047 A1 7/2011 Pance
2011/0164163 A1 7/2011 Bilbrey
2011/0164221 A1 7/2011 Tilleman
2011/0176106 A1 7/2011 Lewkowski
2011/0196610 A1 8/2011 Waldman
2011/0199171 A1 8/2011 Prest
2011/0201213 A1 8/2011 Dabov
2011/0202823 A1 8/2011 Berger
2011/0205209 A1 8/2011 Kurokawa
2011/0211056 A1 9/2011 Publicover et al.
2011/0213664 A1 9/2011 Osterhout
2011/0221672 A1 9/2011 Osterhout
2011/0221896 A1 9/2011 Haddick
2011/0227820 A1 9/2011 Haddick

(56) References Cited

U.S. PATENT DOCUMENTS

2011/0234475 A1 9/2011 Endo
2011/0234631 A1 9/2011 Kim
2011/0241975 A1 10/2011 Mukawa
2011/0248963 A1 10/2011 Lawrence
2011/0285638 A1 11/2011 Harris
2011/0285764 A1 11/2011 Kimura
2012/0021806 A1 1/2012 Maltz
2012/0026088 A1 2/2012 Goran
2012/0032874 A1 2/2012 Mukawa
2012/0035934 A1 2/2012 Cunningham
2012/0050140 A1 3/2012 Border
2012/0050493 A1 3/2012 Ernst
2012/0056093 A1 3/2012 Poteet
2012/0062444 A1 3/2012 Cok
2012/0062594 A1 3/2012 Campbell
2012/0062850 A1 3/2012 Travis
2012/0062998 A1 3/2012 Schultz
2012/0068913 A1 3/2012 Bar-zeev
2012/0069413 A1 3/2012 Schultz
2012/0075168 A1 3/2012 Osterhout
2012/0078628 A1 3/2012 Ghulman
2012/0081800 A1 4/2012 Cheng
2012/0092328 A1 4/2012 Flaks
2012/0092329 A1 4/2012 Koo
2012/0096095 A1 4/2012 Bhargava
2012/0113514 A1 5/2012 Rodman
2012/0119978 A1 5/2012 Border
2012/0120103 A1 5/2012 Border
2012/0120498 A1 5/2012 Harrison
2012/0127062 A1 5/2012 Bar-zeev
2012/0127284 A1 5/2012 Bar-zeev
2012/0133885 A1 5/2012 Howell
2012/0154920 A1 6/2012 Harrison
2012/0162270 A1 6/2012 Fleck
2012/0163013 A1 6/2012 Buelow, II
2012/0169608 A1 7/2012 Forutanpour
2012/0176682 A1 7/2012 Dejong
2012/0188245 A1 7/2012 Hyatt
2012/0194550 A1 8/2012 Osterhout
2012/0194553 A1 8/2012 Osterhout
2012/0194784 A1 8/2012 Shih
2012/0200935 A1 8/2012 Miyao
2012/0206817 A1 8/2012 Totani
2012/0212398 A1 8/2012 Border
2012/0212484 A1 8/2012 Haddick
2012/0212499 A1 8/2012 Haddick
2012/0212593 A1 8/2012 Na
2012/0218301 A1 8/2012 Miller
2012/0223885 A1 9/2012 Perez
2012/0224060 A1 9/2012 Gurevich
2012/0229367 A1 9/2012 Magyari
2012/0233000 A1 9/2012 Fisher
2012/0235885 A1 9/2012 Miller
2012/0237085 A1 9/2012 Meier
2012/0242251 A1 9/2012 Kwisthout
2012/0242570 A1 9/2012 Kobayashi
2012/0242697 A1 9/2012 Border
2012/0242698 A1 9/2012 Haddick
2012/0249741 A1 10/2012 Maciocci
2012/0249797 A1 10/2012 Haddick
2012/0250152 A1 10/2012 Larson
2012/0264510 A1 10/2012 Wigdor
2012/0268449 A1 10/2012 Choi
2012/0287398 A1 11/2012 Baker
2012/0293548 A1 11/2012 Perez
2012/0294478 A1 11/2012 Publicover
2012/0306850 A1 12/2012 Balan
2012/0307198 A1 12/2012 Ifergan
2012/0326948 A1 12/2012 Crocco
2012/0327040 A1 12/2012 Simon et al.
2012/0327116 A1 12/2012 Liu
2013/0009366 A1 1/2013 Hannegan
2013/0009907 A1 1/2013 Rosenberg
2013/0044042 A1 2/2013 Olsson
2013/0063695 A1 3/2013 Hsieh
2013/0069924 A1 3/2013 Robinson
2013/0069985 A1 3/2013 Wong
2013/0070344 A1 3/2013 Takeda
2013/0077049 A1 3/2013 Bohn
2013/0083009 A1 4/2013 Geisner
2013/0083055 A1 4/2013 Piemonte
2013/0088413 A1 4/2013 Raffle
2013/0100259 A1 4/2013 Ramaswamy
2013/0106674 A1 5/2013 Wheeler
2013/0120224 A1 5/2013 Cajigas
2013/0120841 A1 5/2013 Shpunt
2013/0127906 A1 5/2013 Sugita
2013/0127980 A1 5/2013 Haddick
2013/0135198 A1 5/2013 Hodge
2013/0141434 A1 6/2013 Sugden
2013/0154913 A1 6/2013 Genc
2013/0162632 A1 6/2013 Varga
2013/0169530 A1 7/2013 Bhaskar
2013/0176533 A1 7/2013 Raffle
2013/0185052 A1 7/2013 Boyd
2013/0194389 A1 8/2013 Vaught
2013/0196757 A1 8/2013 Latta
2013/0201080 A1 8/2013 Evans
2013/0201081 A1 8/2013 Evans
2013/0207887 A1 8/2013 Raffle
2013/0207970 A1 8/2013 Shpunt
2013/0214909 A1 8/2013 Meijers
2013/0215149 A1 8/2013 Hayashi
2013/0222919 A1 8/2013 Komatsu
2013/0230215 A1 9/2013 Gurman
2013/0234914 A1 9/2013 Fujimaki
2013/0235331 A1 9/2013 Heinrich
2013/0241805 A1 9/2013 Gomez
2013/0241948 A1 9/2013 Kimura
2013/0242405 A1 9/2013 Gupta
2013/0248691 A1 9/2013 Mirov
2013/0249778 A1 9/2013 Morimoto
2013/0249787 A1 9/2013 Morimoto
2013/0250207 A1 9/2013 Bohn
2013/0250430 A1 9/2013 Robbins
2013/0250503 A1 9/2013 Olsson
2013/0257622 A1 10/2013 Davalos
2013/0257709 A1 10/2013 Raffle
2013/0258111 A1 10/2013 Frank
2013/0265212 A1 10/2013 Kato
2013/0265227 A1 10/2013 Julian
2013/0278631 A1 10/2013 Border
2013/0293530 A1 11/2013 Perez
2013/0293580 A1 11/2013 Spivack
2013/0300637 A1 11/2013 Smits
2013/0300652 A1 11/2013 Raffle
2013/0321265 A1 12/2013 Bychkov
2013/0321271 A1 12/2013 Bychkov
2013/0321932 A1 12/2013 Hsu
2013/0335301 A1 12/2013 Wong
2013/0335435 A1 12/2013 Ambrus
2013/0335461 A1 12/2013 Rekimoto
2013/0336528 A1 12/2013 Itani
2013/0336629 A1 12/2013 Mulholland
2013/0342564 A1 12/2013 Kinnebrew
2013/0342571 A1 12/2013 Kinnebrew
2013/0342981 A1 12/2013 Cox
2013/0346245 A1 12/2013 Desore
2014/0028704 A1 1/2014 Wu
2014/0029498 A1 1/2014 Kim
2014/0043682 A1 2/2014 Hussey
2014/0062854 A1 3/2014 Cho
2014/0063054 A1 3/2014 Osterhout
2014/0063055 A1 3/2014 Osterhout
2014/0063473 A1 3/2014 Pasolini
2014/0078043 A1 3/2014 Kim
2014/0078282 A1 3/2014 Aoki
2014/0091984 A1 4/2014 Ashbrook
2014/0101608 A1 4/2014 Ryskamp
2014/0104142 A1 4/2014 Bickerstaff
2014/0104692 A1 4/2014 Bickerstaff
2014/0111864 A1 4/2014 Margulis
2014/0125668 A1 5/2014 Steed
2014/0125785 A1 5/2014 Na

(56) References Cited

U.S. PATENT DOCUMENTS

2014/0129328 A1 5/2014 Mathew
2014/0139655 A1 5/2014 Mimar
2014/0146394 A1 5/2014 Tout
2014/0147829 A1 5/2014 Jerauld
2014/0152530 A1 6/2014 Venkatesha
2014/0152558 A1 6/2014 Salter
2014/0152676 A1 6/2014 Rohn
2014/0153173 A1 6/2014 Pombo
2014/0159995 A1 6/2014 Adams
2014/0160055 A1 6/2014 Margolis
2014/0160137 A1 6/2014 Martin
2014/0160157 A1 6/2014 Poulos
2014/0160170 A1 6/2014 Lyons
2014/0168056 A1 6/2014 Swaminathan
2014/0168266 A1 6/2014 Kimura
2014/0168716 A1 6/2014 King
2014/0168735 A1 6/2014 Yuan
2014/0176591 A1 6/2014 Klein
2014/0176603 A1 6/2014 Kumar
2014/0177023 A1 6/2014 Gao
2014/0183269 A1 7/2014 Glaser
2014/0195918 A1 7/2014 Friedlander
2014/0204759 A1 7/2014 Guo et al.
2014/0206416 A1 7/2014 Aurongzeb
2014/0213280 A1 7/2014 Sandel
2014/0222929 A1 8/2014 Grossman
2014/0225814 A1 8/2014 English
2014/0232651 A1 8/2014 Kress
2014/0240313 A1 8/2014 Varga
2014/0247286 A1 9/2014 Chi
2014/0253588 A1 9/2014 Mandala
2014/0253605 A1 9/2014 Border
2014/0267010 A1 9/2014 Pasquero
2014/0285631 A1 9/2014 Janky
2014/0306866 A1 10/2014 Miller
2014/0310075 A1 10/2014 Ricci
2014/0320389 A1 10/2014 Scavezze
2014/0320971 A1 10/2014 Gupta
2014/0341441 A1 11/2014 Slaby
2014/0347572 A1 11/2014 Liu
2014/0361957 A1 12/2014 Hua
2014/0361976 A1 12/2014 Osman
2014/0362195 A1 12/2014 Ng-thow-hing
2014/0363797 A1 12/2014 Hu
2014/0372957 A1 12/2014 Keane
2014/0375542 A1 12/2014 Robbins
2014/0375545 A1 12/2014 Ackerman
2014/0375680 A1 12/2014 Ackerman
2014/0375683 A1 12/2014 Salter
2015/0002371 A1 1/2015 Burgess
2015/0022542 A1 1/2015 Baba
2015/0029088 A1 1/2015 Kim
2015/0035744 A1 2/2015 Robbins
2015/0042544 A1 2/2015 Sugihara
2015/0084862 A1 3/2015 Sugihara
2015/0097719 A1 4/2015 Balachandreswaran
2015/0134143 A1 5/2015 Willenborg
2015/0143297 A1 5/2015 Wheeler
2015/0145839 A1 5/2015 Hack
2015/0146004 A1 5/2015 Kritt
2015/0147000 A1 5/2015 Salvador Marcos
2015/0153572 A1 6/2015 Miao
2015/0161913 A1 6/2015 Dominguez
2015/0168730 A1 6/2015 Ashkenazi
2015/0168731 A1 6/2015 Robbins
2015/0169953 A1 6/2015 Border
2015/0175068 A1 6/2015 Szostak
2015/0178932 A1 6/2015 Wyatt
2015/0181383 A1 6/2015 Schulz
2015/0186636 A1 7/2015 Tharappel
2015/0198807 A1 7/2015 Hirai
2015/0201834 A1 7/2015 Border
2015/0201835 A1 7/2015 Border
2015/0201836 A1 7/2015 Border
2015/0202962 A1 7/2015 Habashima
2015/0205035 A1 7/2015 Border
2015/0205100 A1 7/2015 Border
2015/0205101 A1 7/2015 Border
2015/0205102 A1 7/2015 Border
2015/0205103 A1 7/2015 Border
2015/0205104 A1 7/2015 Border
2015/0205105 A1 7/2015 Border
2015/0205107 A1 7/2015 Border
2015/0205108 A1 7/2015 Border
2015/0205111 A1 7/2015 Border
2015/0205112 A1 7/2015 Border
2015/0205113 A1 7/2015 Border
2015/0205114 A1 7/2015 Border
2015/0205115 A1 7/2015 Border
2015/0205116 A1 7/2015 Border
2015/0205117 A1 7/2015 Border
2015/0205118 A1 7/2015 Border
2015/0205119 A1 7/2015 Osterhout
2015/0205120 A1 7/2015 Border
2015/0205121 A1 7/2015 Border
2015/0205122 A1 7/2015 Border
2015/0205123 A1 7/2015 Border
2015/0205124 A1 7/2015 Border
2015/0205125 A1 7/2015 Border
2015/0205126 A1 7/2015 Schowengerdt
2015/0205127 A1 7/2015 Border
2015/0205128 A1 7/2015 Border
2015/0205129 A1 7/2015 Border
2015/0205130 A1 7/2015 Border
2015/0205131 A1 7/2015 Border
2015/0205132 A1 7/2015 Osterhout
2015/0205135 A1 7/2015 Border
2015/0205346 A1 7/2015 Border
2015/0205347 A1 7/2015 Border
2015/0205348 A1 7/2015 Nortrup
2015/0205349 A1 7/2015 Nortrup
2015/0205351 A1 7/2015 Osterhout
2015/0205373 A1 7/2015 Osterhout
2015/0205378 A1 7/2015 Osterhout
2015/0205384 A1 7/2015 Osterhout
2015/0205385 A1 7/2015 Osterhout
2015/0205387 A1 7/2015 Osterhout
2015/0205388 A1 7/2015 Osterhout
2015/0205401 A1 7/2015 Osterhout
2015/0205402 A1 7/2015 Osterhout
2015/0205494 A1 7/2015 Scott
2015/0205566 A1 7/2015 Osterhout
2015/0206008 A1 7/2015 Border
2015/0206173 A1 7/2015 Nortrup
2015/0212324 A1 7/2015 Osterhout
2015/0212327 A1 7/2015 Osterhout
2015/0213584 A1 7/2015 Ishikawa
2015/0213650 A1 7/2015 Barzuza
2015/0213754 A1 7/2015 Amjad
2015/0226966 A1 8/2015 Osterhout
2015/0226967 A1 8/2015 Osterhout
2015/0228099 A1 8/2015 Osterhout
2015/0228119 A1 8/2015 Osterhout
2015/0228120 A1 8/2015 Osterhout
2015/0229019 A1 8/2015 Osterhout
2015/0234508 A1 8/2015 Cho
2015/0235422 A1 8/2015 Lohse
2015/0235429 A1 8/2015 Miller
2015/0235622 A1 8/2015 Border
2015/0241963 A1 8/2015 Nortrup
2015/0241964 A1 8/2015 Nortrup
2015/0241965 A1 8/2015 Nortrup
2015/0241966 A1 8/2015 Nortrup
2015/0243039 A1 8/2015 Holz
2015/0245131 A1 8/2015 Facteau
2015/0253573 A1 9/2015 Sako
2015/0260887 A1 9/2015 Salisbury
2015/0260986 A1 9/2015 Nortrup
2015/0261015 A1 9/2015 Han
2015/0277113 A1 10/2015 Border
2015/0277116 A1 10/2015 Richards
2015/0277118 A1 10/2015 Border
2015/0277120 A1 10/2015 Border
2015/0277122 A1 10/2015 Border

(56) References Cited

U.S. PATENT DOCUMENTS

2015/0277549 A1 10/2015 Border
2015/0277559 A1 10/2015 Vescovi
2015/0279010 A1 10/2015 Cianfrone
2015/0279104 A1 10/2015 Border
2015/0279107 A1 10/2015 Border
2015/0279108 A1 10/2015 Border
2015/0287048 A1 10/2015 Nortrup
2015/0293587 A1 10/2015 Wilairat
2015/0294156 A1 10/2015 Border
2015/0294627 A1 10/2015 Yoo
2015/0301593 A1 10/2015 Border
2015/0302646 A1 10/2015 Osterhout
2015/0302647 A1 10/2015 Osterhout
2015/0304368 A1 10/2015 Vaccari
2015/0309313 A1 10/2015 Border
2015/0309314 A1 10/2015 Border
2015/0309317 A1 10/2015 Osterhout
2015/0309534 A1 10/2015 Osterhout
2015/0309562 A1 10/2015 Shams
2015/0309995 A1 10/2015 Osterhout
2015/0316766 A1 11/2015 Weaver
2015/0316769 A1 11/2015 Border
2015/0316770 A1 11/2015 Border
2015/0316771 A1 11/2015 Border
2015/0316772 A1 11/2015 Border
2015/0331241 A1 11/2015 Haddick
2015/0332032 A1 11/2015 Alameh
2015/0338661 A1 11/2015 Osterhout
2015/0346496 A1 12/2015 Haddick
2015/0346511 A1 12/2015 Osterhout
2015/0347823 A1 12/2015 Monnerat
2015/0355466 A1 12/2015 Border
2015/0355468 A1 12/2015 Osterhout
2015/0356772 A1 12/2015 Osterhout
2015/0356775 A1 12/2015 Osterhout
2015/0356776 A1 12/2015 Osterhout
2015/0356777 A1 12/2015 Osterhout
2015/0356778 A1 12/2015 Osterhout
2015/0356779 A1 12/2015 Osterhout
2015/0363975 A1 12/2015 Osterhout
2015/0382305 A1 12/2015 Drincic
2016/0005003 A1 1/2016 Norris
2016/0007849 A1 1/2016 Krueger
2016/0011417 A1 1/2016 Border
2016/0015470 A1 1/2016 Border
2016/0018640 A1 1/2016 Haddick
2016/0018641 A1 1/2016 Haddick
2016/0018642 A1 1/2016 Haddick
2016/0018644 A1 1/2016 Border
2016/0018645 A1 1/2016 Haddick
2016/0018646 A1 1/2016 Osterhout
2016/0018647 A1 1/2016 Osterhout
2016/0018648 A1 1/2016 Osterhout
2016/0018649 A1 1/2016 Osterhout
2016/0018650 A1 1/2016 Haddick
2016/0018651 A1 1/2016 Haddick
2016/0018652 A1 1/2016 Haddick
2016/0018653 A1 1/2016 Haddick
2016/0018654 A1 1/2016 Haddick
2016/0019715 A1 1/2016 Haddick
2016/0019719 A1 1/2016 Osterhout
2016/0021304 A1 1/2016 Osterhout
2016/0025974 A1 1/2016 Osterhout
2016/0025977 A1 1/2016 Osterhout
2016/0025979 A1 1/2016 Border
2016/0025980 A1 1/2016 Osterhout
2016/0026239 A1 1/2016 Border
2016/0027211 A1 1/2016 Osterhout
2016/0027414 A1 1/2016 Osterhout
2016/0035139 A1 2/2016 Fuchs
2016/0045810 A1 2/2016 Minkovitch
2016/0048018 A1 2/2016 De Matos Pereira Vieira
2016/0048019 A1 2/2016 Haddick
2016/0048021 A1 2/2016 Border
2016/0048023 A1 2/2016 Haddick
2016/0048160 A1 2/2016 Haddick
2016/0049008 A1 2/2016 Haddick
2016/0054566 A1 2/2016 Osterhout
2016/0055675 A1 2/2016 Kasahara
2016/0062118 A1 3/2016 Osterhout
2016/0062121 A1 3/2016 Border
2016/0062122 A1 3/2016 Border
2016/0077342 A1 3/2016 Osterhout
2016/0085071 A1 3/2016 Border
2016/0085072 A1 3/2016 Haddick
2016/0085278 A1 3/2016 Osterhout
2016/0091718 A1 3/2016 Border
2016/0091719 A1 3/2016 Border
2016/0103325 A1 4/2016 Mirza
2016/0109709 A1 4/2016 Osterhout
2016/0109711 A1 4/2016 Border
2016/0109713 A1 4/2016 Osterhout
2016/0116738 A1 4/2016 Osterhout
2016/0116745 A1 4/2016 Osterhout
2016/0116979 A1 4/2016 Border
2016/0131904 A1 5/2016 Border
2016/0131911 A1 5/2016 Border
2016/0131912 A1 5/2016 Border
2016/0132082 A1 5/2016 Border
2016/0133201 A1 5/2016 Border
2016/0137312 A1 5/2016 Osterhout
2016/0147063 A1 5/2016 Border
2016/0147064 A1 5/2016 Border
2016/0147065 A1 5/2016 Border
2016/0147070 A1 5/2016 Border
2016/0154242 A1 6/2016 Border
2016/0154244 A1 6/2016 Border
2016/0161743 A1 6/2016 Osterhout
2016/0161747 A1 6/2016 Osterhout
2016/0170207 A1 6/2016 Haddick
2016/0170208 A1 6/2016 Border
2016/0170209 A1 6/2016 Border
2016/0170699 A1 6/2016 Border
2016/0171769 A1 6/2016 Haddick
2016/0171846 A1 6/2016 Brav
2016/0178904 A1 6/2016 Deleeuw
2016/0187651 A1 6/2016 Border
2016/0187658 A1 6/2016 Osterhout
2016/0202946 A1 7/2016 Osterhout
2016/0207457 A1 7/2016 Border
2016/0216516 A1 7/2016 Border
2016/0216517 A1 7/2016 Border
2016/0231571 A1 8/2016 Border
2016/0239985 A1 8/2016 Haddick
2016/0240008 A1 8/2016 Haddick
2016/0246055 A1 8/2016 Border
2016/0252731 A1 9/2016 Border
2016/0259166 A1 9/2016 Border
2016/0274361 A1 9/2016 Border
2016/0274365 A1 9/2016 Bailey
2016/0282626 A1 9/2016 Border
2016/0286177 A1 9/2016 Border
2016/0286203 A1 9/2016 Border
2016/0286210 A1 9/2016 Border
2016/0306173 A1 10/2016 Tsukahara
2016/0329634 A1 11/2016 Osterhout
2016/0357019 A1 12/2016 Border
2016/0370606 A1 12/2016 Huynh
2017/0031395 A1 2/2017 Osterhout
2017/0219831 A1 8/2017 Haddick
2017/0220865 A1 8/2017 Osterhout
2017/0227778 A1 8/2017 Osterhout
2017/0235133 A1 8/2017 Border
2017/0235134 A1 8/2017 Border
2017/0351098 A1 12/2017 Osterhout
2018/0003988 A1 1/2018 Osterhout

FOREIGN PATENT DOCUMENTS

CA 2388766 12/2003
EP 368898 A1 5/1990
EP 777867 A1 6/1997
EP 1326121 A2 7/2003
EP 2207164 A2 7/2010

(56) References Cited

FOREIGN PATENT DOCUMENTS

| | | | |
|---|---|---|---|
| EP | 2486450 | A1 | 8/2012 |
| EP | 2490130 | A1 | 8/2012 |
| EP | 2502410 | A1 | 9/2012 |
| EP | 2674834 | A2 | 12/2013 |
| GB | 2491984 | A | 12/2012 |
| JP | H07110735 | A | 4/1995 |
| JP | 200102036 | A | 4/2000 |
| JP | 2005138755 | A | 6/2005 |
| JP | 2009171505 | A | 7/2009 |
| JP | 5017989 | B2 | 9/2012 |
| JP | 2012212990 | A | 11/2012 |
| KR | 1020110101944 | | 9/2011 |
| WO | 2011143655 | A1 | 11/2011 |
| WO | 2012040030 | A2 | 3/2012 |
| WO | 2012058175 | A1 | 5/2012 |
| WO | 2012064546 | A1 | 5/2012 |
| WO | 2012082807 | A2 | 6/2012 |
| WO | 2012118573 | A1 | 9/2012 |
| WO | 2012118575 | A2 | 9/2012 |
| WO | 2013043288 | A2 | 3/2013 |
| WO | 2013049248 | A2 | 4/2013 |
| WO | 2013050650 | A1 | 4/2013 |
| WO | 2013103825 | A1 | 7/2013 |
| WO | 2013110846 | A1 | 8/2013 |
| WO | 2013170073 | A1 | 11/2013 |
| WO | 2013176079 | A1 | 11/2013 |
| WO | 2015109145 | A1 | 7/2015 |
| WO | 2015164276 | A1 | 10/2015 |
| WO | 2015179877 | A3 | 11/2015 |
| WO | 2015195444 | A1 | 12/2015 |
| WO | 2016044035 | A1 | 3/2016 |
| WO | 2016073734 | A1 | 5/2016 |
| WO | 2016133886 | A1 | 8/2016 |
| WO | 2016205601 | A1 | 12/2016 |
| WO | 2017100074 | A1 | 6/2017 |

OTHER PUBLICATIONS

US 8,792,178 B2, 07/2014, Totani (withdrawn)

US 9,195,056 B2, 11/2015, Border (withdrawn)

ARToolKit. (Oct. 13, 2005). "Hardware," located at: https://web.archive.org/web/20051013062315/http://www.hitl.washington.edu:80/artoolkit/documentation/hardware.htm , retrieved on Oct. 26, 2020.

Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf, retrieved on Oct. 26, 2020.

Bimber, Oliver et al. (2005). "Spatial Augmented Reality: Merging Real and Virtual Worlds," A. K. Peters, Ltd., Wellesley, MA.

Non-Final Office Action dated Jan. 10, 2020, for U.S. Appl. No. 16/149,405, filed Oct. 2, 2018, four pages.

Notice of Allowance dated Jul. 28, 2020, for U.S. Appl. No. 16/149,405, filed Oct. 2, 2018, 7 pages.

PCT/US2015/059264, , "International Applicatin Serial No. PCT/US2015/059264, International Search Report and Written Opinion dated Feb. 19, 2016", Osterhout Group, Inc., 11 Pages.

Allison, R S. et al. "Tolerance of Temporal Delay In Virtual Environments," VR '01 Proceedings of the Virtual Reality 2001 Conference (VR'01), Centre for Vision Research and Departments of Computer Science and Psychology, Mar. 2001, 1-8.

Bezryadin, et al. "Brightness Calculation in Digital Image Processing," Technologies for Digital Fulfillment 2007, Las Vegas, NV, 2007, pp. 1-6.

Clements-Cortes, et al. "Short-Term Effects of Rhythmic Sensory Stimulation in Alzheimer's Disease: An Exploratory Pilot Study," Journal of Alzheimer's Disease 52 (2016), IOS Press Feb. 9, 2016, pp. 651-660.

Fathi, A. et al. (2012). "Social interactions: A First-Person Perspective," Computer Vision and Pattern Recognition (CVPR), IEEE Conference on. IEEE, 2012, eight Pages.

Huang, Jia-Bin, "Image Completion Using Planar Structure Guidance", ACM Transactions on Graphics, vol. 33, No. 4, Article 129, Jul. 2014, pp. 1-10.

Janin, Adam L. et al., (1993). "Calibration of Head-Mounted Displays for Augmented Reality Applications", Research and Technology Boeing Computer Services MS 7L-48 P.O. Box 24346 Seattle, WA 98124-0346 Virtual Reality Annual International Symposium, 1993., 1993 IEEE, 10 Pages.

Lang, Manuel et al. "Nonlinear Disparity Mapping For Stereoscopic 3D", Jul. 2010, pp. 1-10.

Logbar Inc., "Ring: Shortcut Everything", https://www.kickstarter.com/projects/1761670738/ring-shortcut-everything, Dec. 2014, 22 pages.

Losev, O. et al. (Nov. 2016). "Light-emitting Diode," https://en.wikipedia.orf/wiki/Lightemitting...diode, pp. 1-25.

Mastandrea. "Mycestro, The Next Generation 3D Mouse," https://www.kickstarter.com/projects/mycestro/mycestrotm-the-next-generation-3d-mouse. Dec. 2014, 22 pages.

Pamplona, Vitor R. et al., "Photorealistic Models for Pupil Light Reflex and Iridal Pattern Deformation", ACM Transactions on Graphics, vol. 28, No. 4, Article 106, Publication date: Aug. 2009, pp. 1-12.

PCT/2016/064441, Application Serial No. PCT/US2016/064441, International Search Report and Written Opinion dated Feb. 7, 2017, Osterhout Group, Inc., 16 pages.

PCT/US2015/011697, "International Application Serial No. PCT/US2015/011697, international Search Report and Written Opinion dated Apr. 13, 2015", Osterhout Group, Inc., 14 pages.

PCT/US2015/026704, "International Search Report and Written Opinion" dated Aug. 21, 2015, 15 pages.

PCT/US2015/035192, , "International Application Serial No. PCT/US2015/035192, International Search Report and Written Opinion dated Sep. 3, 2015", Osterhout Group, Inc., 11 pages.

PCT/US2016/018040, "International Application Serial No. PCT/US2016/018040, International Search Report and Written Opinion dated Jul. 6, 2016," Osterhout Group, Inc. 10 pages.

PCT/US2016/038008, International Application Serial No. PCT/US2016/038008, International Search Report and Written Opinion dated Oct. 27, 2016, Osterhout Group, Inc. eight pages.

PCT/US2016/042440, "Application Serial No. PCT/US2016/042440, The International Search Report and Written Opinion dated Oct. 13, 2016," Osterhout Group, Inc. seven pages.

PCTUS2015033379, , "International Application Serial No. PCT/US2015/033379, International Search Report and Written Opinion dated Nov. 30, 2015", Osterhout Group, Inc., 12 Pages.

PCTUS2017046701, "Application Serial No. PCTUS2017046701, International Search Report and the Written Opinion dated Nov. 6, 2017", 7 pages.

Plainis, et al., "The Physiologic Mechanism of Accommodation", Cataract & Refractive Surgery Today Europe, Apr. 2014, pp. 23-29.

Schedwill, "Bidirectional OLED Microdisplay", Fraunhofer Research Institution for Organics, Materials and Electronic Device COMEDD, Apr. 11, 2014, 2 pages.

Vogel, et al.,, "Data glasses controlled by eye movements", Information and communication, Fraunhofer-Gesellschaft, Sep. 22, 2013, 2 pages.

Walton, Z. "Wear This Smartphone Controller on Your Finger," http://www.webpronews.com/wear-this-smartphone-controller-on-your-finger-2012-06, 5 pages.

Ye, Hui et al., "High Quality Voice Morphing", Cambridge University Engineering Department Trumpington Street, Cambridge, England, CB2 1PZ, 2004, I-9-I-12.

"Audio Spotlight," by Holosonics, http://www.holosonics.com, accessed Jul. 3, 2014, three pages.

"Genius Ring Mice," http://www.geniusnet.com/Genius/wSite/productCompare/compare.jsp, Dec. 23, 2014, one page.

"Help Requested! Comments and input needed for new coaxial UAS-DIY Drones," http://diydrones.com/profiles/blogs/help-requested-comments-and-input-needed-for-new-coaxial-uas, Mar. 5, 2015, 1-3.

"How Ascent AeroSystems is looking to add to your outdoor adventure," http://droneblog.com/2015/03/23/how-ascent-aerosystems-is-looking-to-add-to-your-outdoor-adventure/#!prettyPhoto, Mar. 23, 2015, 1-10.

(56) References Cited

OTHER PUBLICATIONS

"Lightberry," https://web.archive.org/web/20131201194408/http:1/lightberry.eu/, Dec. 1, 2013, 11 pages.
"Meet Nod, the Bluetooth Ring That Wants to Replace your Mouse," http://www.pcmag.com/article2/0.2817.2457238.00.asp, Apr. 29, 2014, 6 pages.
"Sound from Ultrasound," Wikipedia entry. http://en.m.wikipedia.org/wiki/Sound_from_ultrasound, accessed Jul. 3, 2014, 13 pages.
Jacob, R. "Eye Tracking in Advanced Interface Design", Virtual Environments and Advanced Interface Design, Oxford University Press, Inc. (Jun. 1995).
Rolland, J. et al., "High-resolution inset head-mounted display", Optical Society of America, vol. 37, No. 19, Applied Optics, (Jul. 1, 1998).
Tanriverdi, V. et al. (Apr. 2000). "interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).

2ND EARHORN ROTATION
NOT REQUIRED
308
310
304

ONE EARHORN ROTATE
CLEAR OPPOSITE TEMPLE
310
308
304

304
SINGLE EARHORN ROTATION
ALLOWS FULL FOLDING
310
308
312

LANGUAGE TRANSLATION WITH HEAD-WORN COMPUTING

CROSS REFERENCE TO RELATED APPLICATIONS

This application is a continuation of U.S. Non-Provisional Ser. No. 16/149,405, filed Oct. 2, 2018 (now U.S. Publication No. 2019-0266247A1), which is a continuation of Ser. No. 15/494,827, filed Apr. 24, 2017 (now U.S. Pat. No. 10,146,772 issued Dec. 4, 2018), which is a continuation of Ser. No. 14/659,815, filed Mar. 17, 2015 (now U.S. Pat. No. 9,672,210 issued Jun. 6, 2017), which is a continuation-in-part of the following U.S. patent applications:

Ser. No. 14/490,586 filed Sep. 18, 2014 (now U.S. Pat. No. 9,423,842 issued Aug. 23, 2016); Ser. No. 14/307,465 filed Jun. 17, 2014 (now U.S. Pat. No. 9,651,787 issued May 16, 2017); Ser. No. 14/323,123 filed Jul. 3, 2014 (now abandoned); Ser. No. 14/262,615 filed Apr. 25, 2014 (now U.S. Pat. No. 9,158,116 issued Oct. 13, 2015).

All of the above-identified applications and patents are hereby incorporated by reference in their entirety.

BACKGROUND

Field of the Invention

This invention relates to head worn computing. More particularly, this invention relates to language translation systems for head-worn computers.

Description of Related Art

Wearable computing systems have been developed and are beginning to be commercialized. Many problems persist in the wearable computing field that need to be resolved to make them meet the demands of the market.

SUMMARY

Aspects of the present invention relate to language translation systems for head-worn computers.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE DRAWINGS

Embodiments are described with reference to the following Figures. The same numbers may be used throughout to reference like features and components that are shown in the Figures.

While the invention has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present invention relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
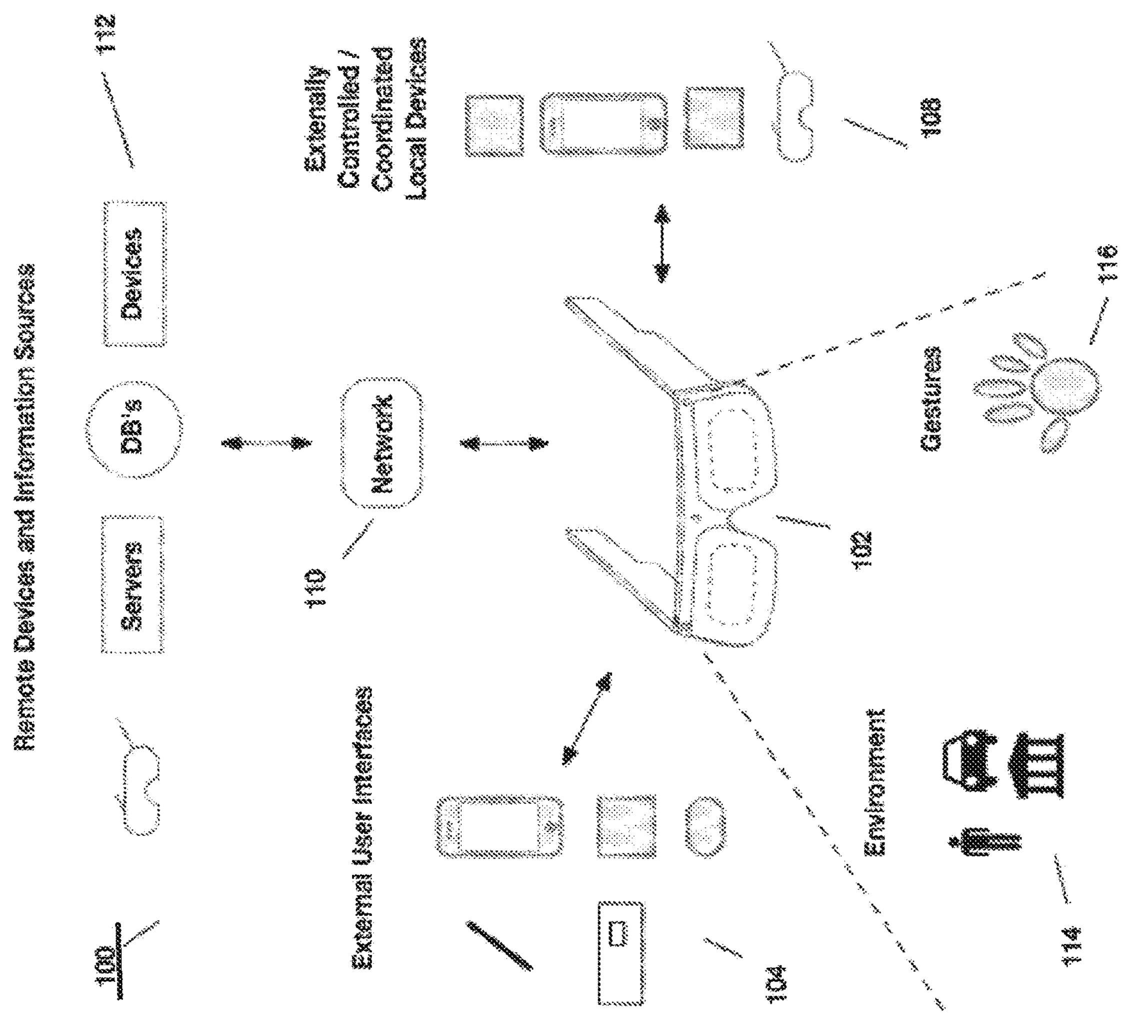
FIG. 1 illustrates a head worn computing system in accordance with the principles of the present invention.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116 of body parts of a user. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCoS, DLP), emissive displays (e.g. OLED, LED), hologram, TIR waveguides, and the like. In embodiments, lighting systems used in connection with the display optics may be solid state lighting systems, such as LED, OLED, quantum dot, quantum dot LED, etc. In addition, the optical configuration may be monocular or binocular. It may also include vision corrective optical components. In embodiments, the optics may be packaged as contact lenses. In other embodiments, the HWC 102 may be in the form of a helmet with a see-through shield, sunglasses, safety glasses, goggles, a mask, fire helmet with see-through shield, police helmet with see through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyper-spectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI, such as a keyboard, touch surface, button(s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
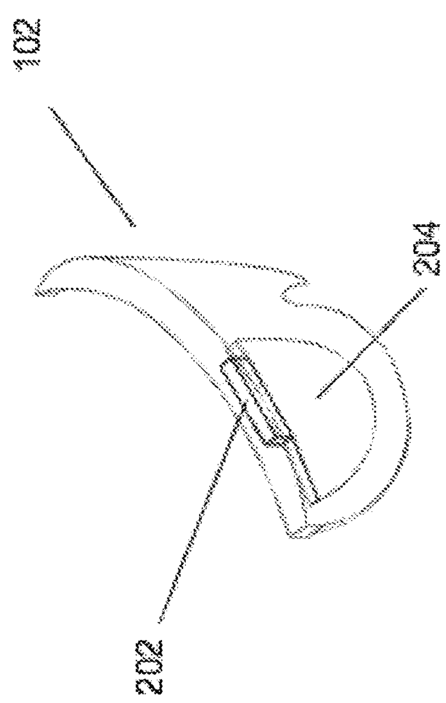
FIG. 2 illustrates a head worn computing system with optical system in accordance with the principles of the present invention.

FIG. 2 illustrates a HWC 102 with an optical system that includes an upper optical module 202 and a lower optical module 204. While the upper and lower optical modules 202 and 204 will generally be described as separate modules, it should be understood that this is illustrative only and the present invention includes other physical configurations, such as that when the two modules are combined into a single module or where the elements making up the two modules are configured into more than two modules. In embodiments, the upper module 202 includes a computer controlled display (e.g. LCoS, DLP, OLED, etc.) and image light delivery optics. In embodiments, the lower module includes eye delivery optics that are configured to receive the upper module's image light and deliver the image light to the eye of a wearer of the HWC. In FIG. 2, it should be noted that while the upper and lower optical modules 202 and 204 are illustrated in one side of the HWC such that image light can be delivered to one eye of the wearer, that it is envisioned by the present invention that embodiments will contain two image light delivery systems, one for each eye. It should also be noted that while many embodiments refer to the optical modules as "upper" and "lower" it should be understood that this convention is being used to make it easier for the reader and that the modules are not necessarily located in an upper-lower relationship. For example, the image generation module may be located above the eye delivery optics, below the eye delivery optics, on a side of the eye delivery optics, or otherwise positioned to satisfy the needs of the situation and/or the HWC 102 mechanical and optical requirements.

An aspect of the present invention relates to the mechanical and electrical construction of a side arm of a head worn computer. In general, when a head worn computer takes the form of glasses, sun-glasses, certain goggles, or other such forms, two side arms are included for mounting and securing the had worn computer on the ears of a person wearing the head worn computer. In embodiments, the side arms may also contain electronics, batteries, wires, antennas, computer processors, computer boards, etc. In embodiments, the side arm may include two or more sub assemblies. For example, as will be discussed in more detail below, the side arm may include a temple section and an ear horn section. The two sections may, for example, be mechanically arranged to allow an ear horn section to move such that both side arms can fold into a closed position.

Figure 3B:
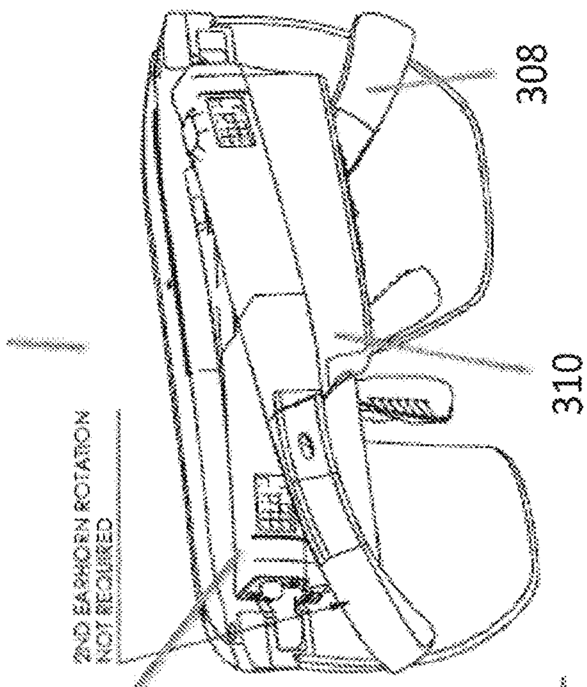
FIG. 3A, FIG. 3B, and FIG. 3C illustrate three views of a head worn computer in accordance with the principles of the present invention.
Figure 3A:
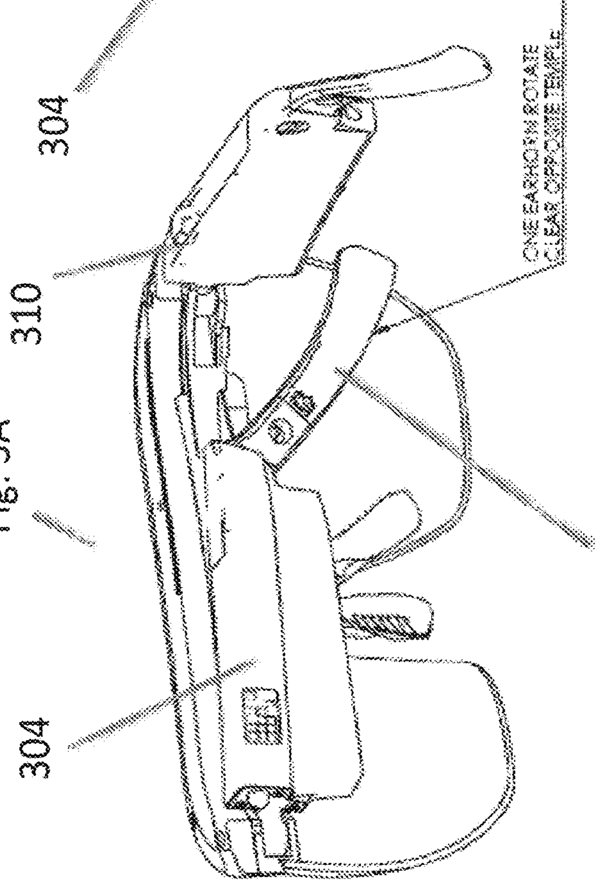
Figure 3C:
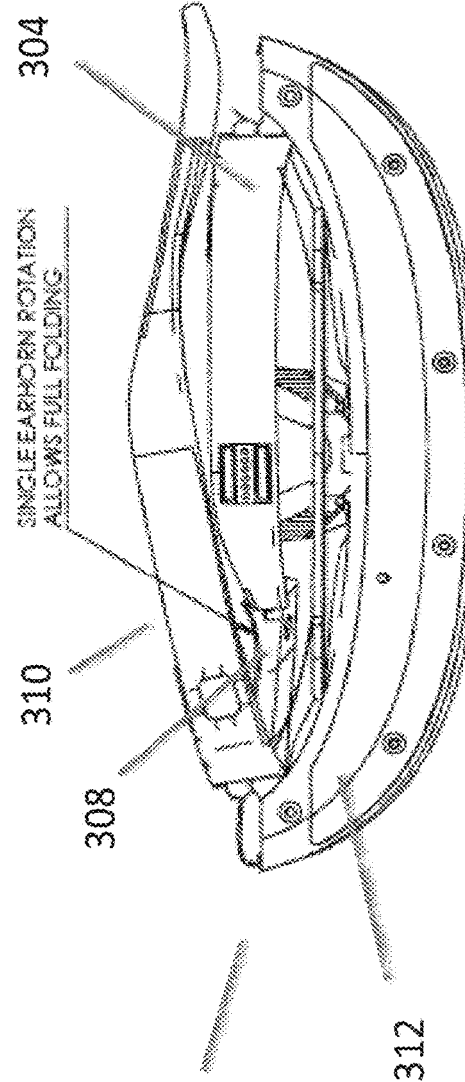

FIG. 3A, FIG. 3B and FIG. 3C illustrate three separate views of a head worn computer 102 according to the principles of the present invention. Turning to the head worn computer illustrated as FIG. 3A, one side arm of the HWC 102 is folded into its closed position. The ear horn section 308 of the side arm is rotated relative to its temple section 304 to create space relative to the other side arm 310 so when the other side arm is moved into its closed position it can fully close. In a situation where the ear horn did not rotate to create the space (not illustrated) the ear horn would physically interfere with the other side arm 310, when the side arm was in the closed position, and prevent the other side arm 310 from fully closing. The HWC FIG. 3B view illustrates the HWC FIG. 3B with both side arms folded into a fully closed position. Note that the ear horn 308 is in the rotated position with respect to its temple section 304 such that the other arm 310 closed without interfering with the ear horn 308. The HWC FIG. 3C view also illustrates both arms in closed positions with the ear horn 308 rotated to create the space for the other arm 310 to fully close. FIG. 3C also illustrates a portion of the HWC 102 where electronics may be housed in a top mount 312. The top mount may contain electronics, sensors, optics, processors, memory, radios, antennas, etc.

Figure 4:
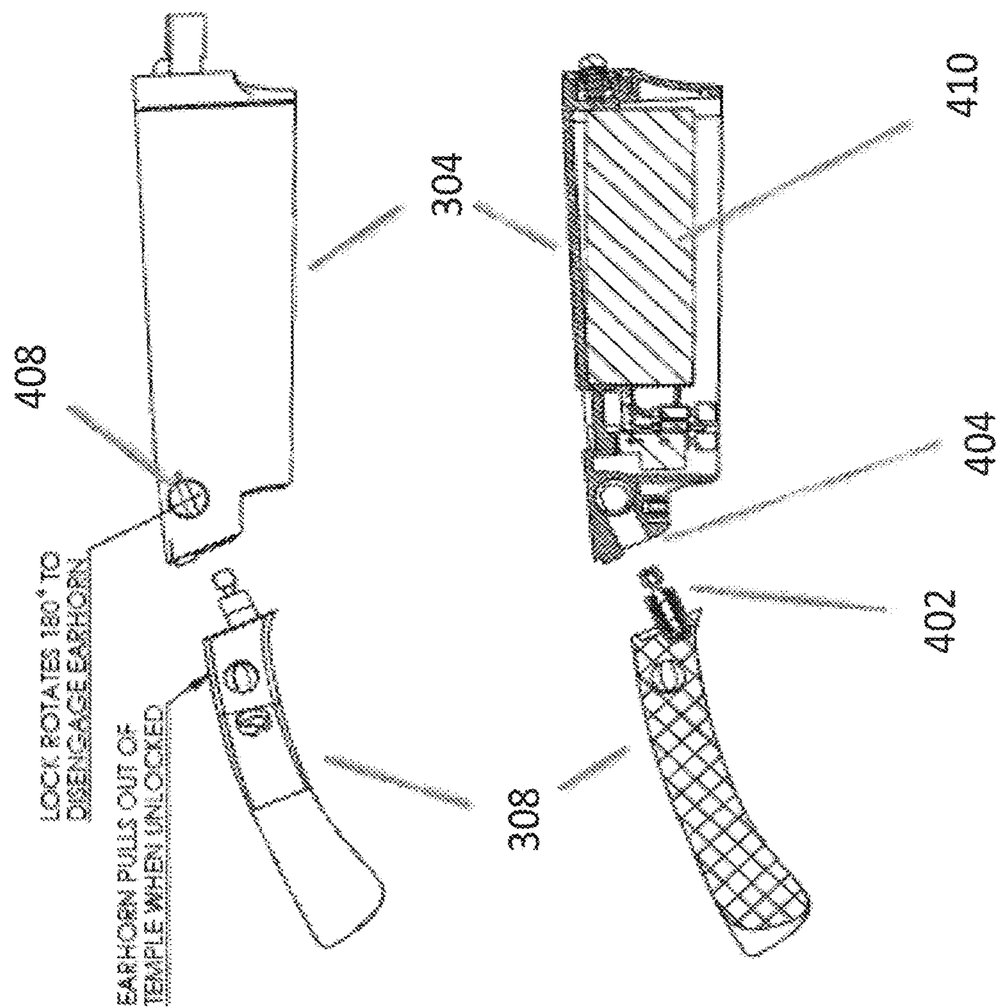
FIG. 4 illustrates a temple and ear horn in accordance with the principles of the present invention.

FIG. 4 illustrates a side arm configuration in accordance with the principles of the present invention. In this embodiment, the side arm includes two sub assemblies: the temple section 304 and the ear horn 308. FIG. 4 illustrates two views of the side arm assembly, one from an outer perspective and one from a sectioned perspective. The ear horn includes a pin 402 that is designed to fit into a hole 404 and to be secured by connector 408. The connector 408 is rotatable and in one position locks the pin 402 in place and in another position unsecures the pin 402 such that the ear horn 308 can be removed and re-attached to the temple section 304. This allows the detachment and re-attachment of the ear horn 308 from the temple section 304. This also allows for the sale of different ear horns 308 for replacement, of which a variety of colors and patterns may be offered. In embodiments, the temple section 304 may include a battery compartment 410 and other electronics, wires, sensors, processors, etc.

Figure 5B:
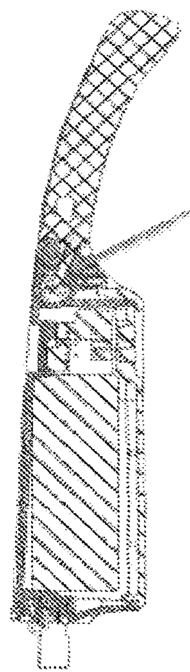
FIG. 5A, FIG. 5B, FIG. 5C, FIG. 5D, FIG. 5E and FIG. 5F illustrate a temple and ear horn assembly in various states in accordance with the principles of the present invention.
Figure 5D:
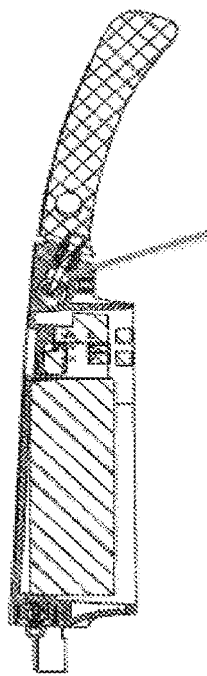
Figure 5F:
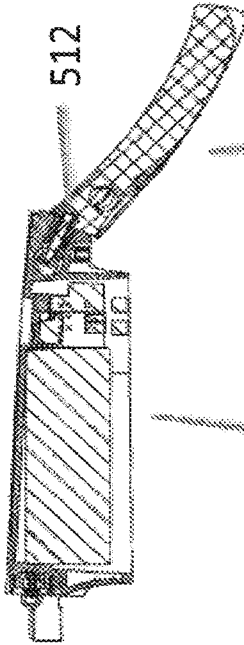
Figure 5A:
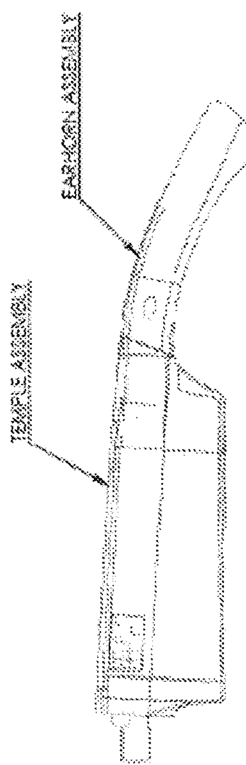
Figure 5C:
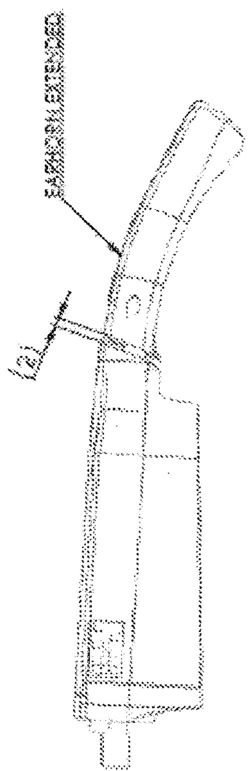
Figure 5E:
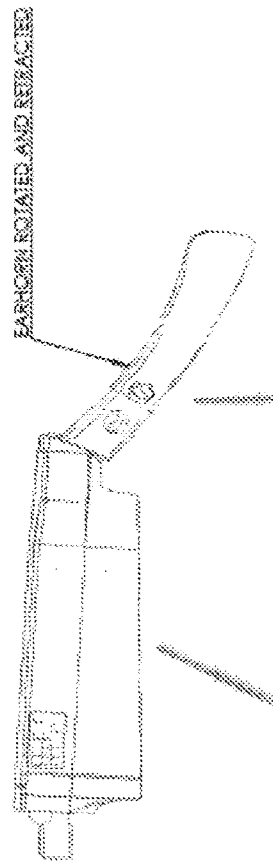

FIG. 5A, FIG. 5B, FIG. 5C, FIG. 5D, FIG. 5E and FIG. 5F illustrate several views of a HWC side arm with temple 304 and ear horn 308 sections. The views include outer perspectives and cross sections as well as various states of the security of the ear horn 308 with the temple section 304. One embodiment of an outer perspective and cross-section of a temple assembly and earhorn assembly is shown in FIG. 5A and FIG. 5B, respectively, including connector and pin assembly 510A, wherein the ear horn is in its final secured position and ready to be put on the head of a user FIG. 5C and FIG. 5D illustrate the ear horn 308 and the temple section 304 in a secure, but separated and un-rotated position. The same pin 402 and connector 408 system described in connection with FIG. 4 is illustrated in the cross sections of FIG. 5E and FIG. 5F at connector and pin assembly 512. In the secured un-rotated position the pin is pulled internally within the temple section firmly such that it stays in place. FIG. 5C and FIG. 5D illustrate a state where the ear horn 308 is separated from the temple section 304. This state is achieved when pressure is used to pull on the ear horn 308. In embodiments, the pressure is exerted by a user pulling on the ear horn 308, which compresses a spring in the connector and pin assembly 510B that is mechanically associated with the pin 402 in the ear horn 308. The mechanism uses the spring to maintain pressure on the pin 402 to maintain connection with the connector 408 when the connector 408 is in a position to lock the pin 402 in position. FIG. 5E and FIG. 5F illustrates a state where, after the ear horn 308 has been pulled into the state described in connection with FIG. 5C and FIG. 5D, the ear horn 308 is rotated about the pin 402. This puts the ear horn 308 in a rotated position as described herein such that the first arm, with this rotated ear horn 308, does not interfere with the closure of the other arm 310 when the two arms are folded into the closed position. FIG. 5E and FIG. 5F illustrates the connector and pin assembly as continuing to secure the ear horn 308 to the temple 304 in the rotated position.

Figure 6:
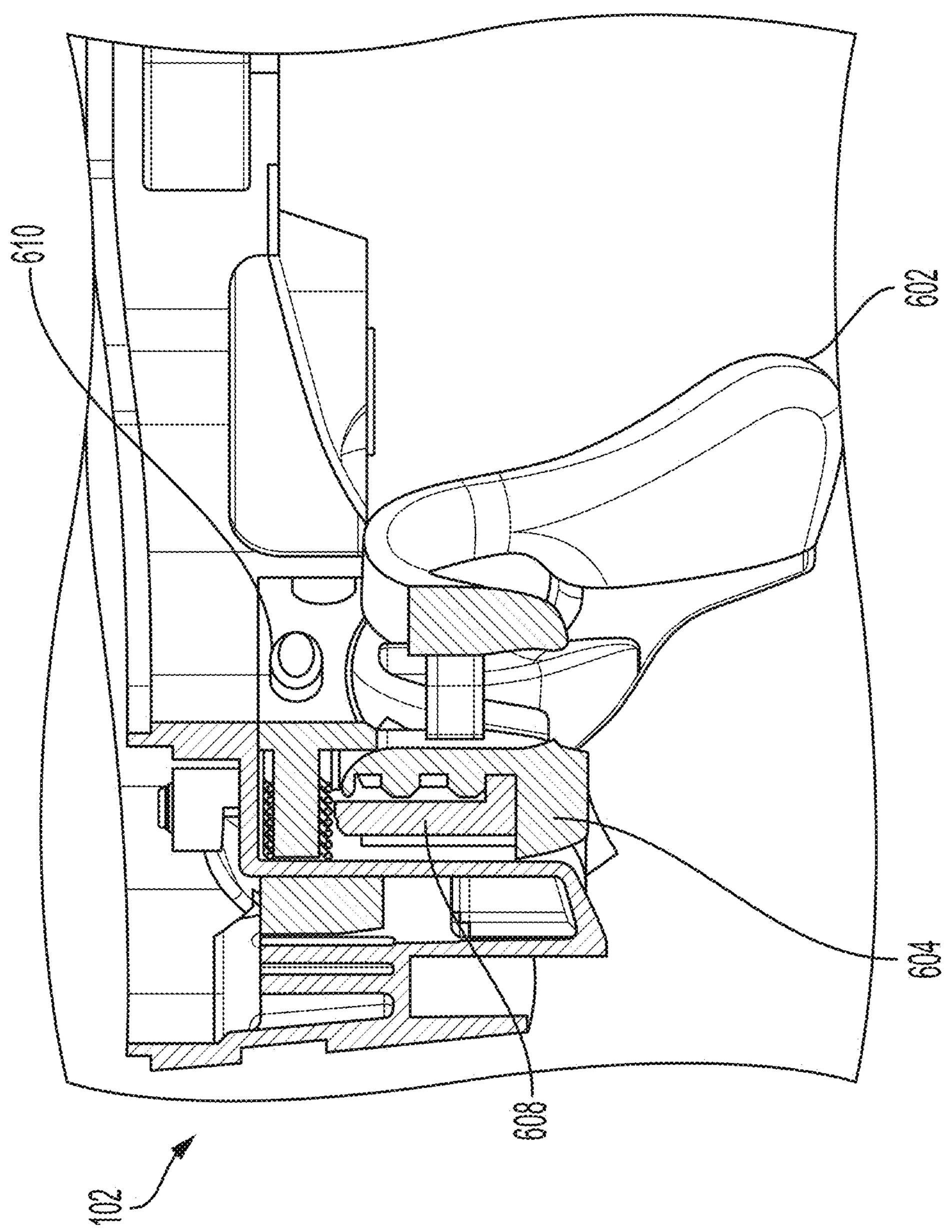
FIG. 6 illustrates an adjustable nose bridge assembly in accordance with the principles of the present invention.

An aspect of the present invention relates to an adjustable nose bridge. An adjustable nose bridge may be important with head worn computers, especially those with computer displays, to ensure comfort and alignment of the displays and/or other portions of the head worn computer. FIG. 6 illustrates a HWC 102 with an adjustable nose bridge 602. The nose bridge is adjustable through a mechanism in the HWC 102. In embodiments, the mechanism includes a fixed notched attachment 604, a movable pin 608 adapted to fit into the notches of the notched attachment 604, and a selection device 610 that is attached to the movable pin 608. The movable pin 608 and nose bridge 602 are connected such that the as the movable pin 608 shifts in position the nose bridge 602 moves in position as well. The selection device 610 causes the movable pin 608 to engage and disengage with the fixed notched attachment 604 when presses and allowed to retract. As illustrated in FIG. 6, the selection device 610 is not in a pressed position so the movable pin 608 is engaged with the notched attachment

Figure 7:
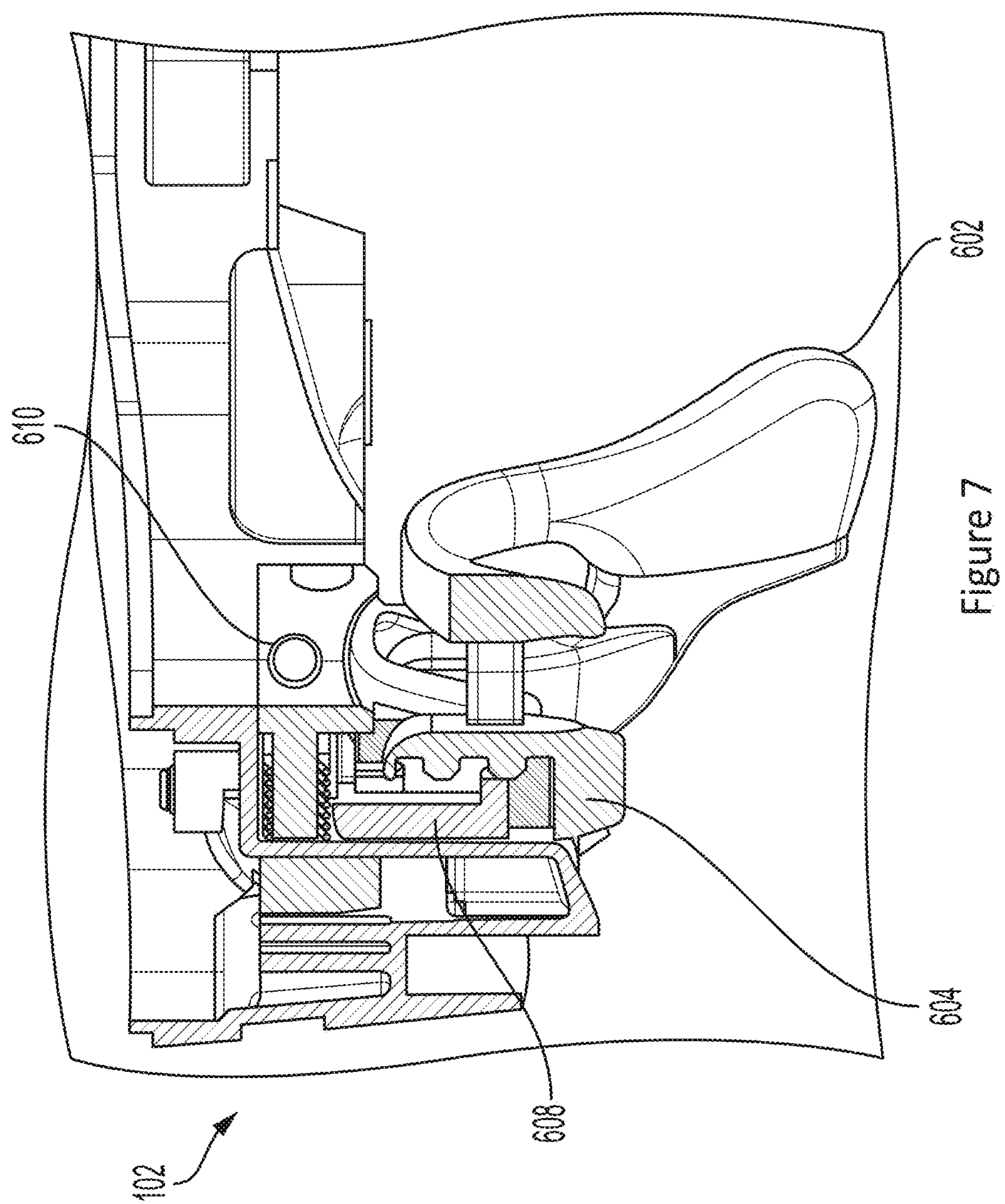
FIG. 7 illustrates an adjustable nose bridge assembly in accordance with the principles of the present invention.

604 such that the nose bridge is securely attached in a stable position. FIG. 7 illustrates a scenario where the selection device is pressed, or activated, such that the moveable pin 608 is no longer engaged with the fixed notched attachment 604. This allows the nose bridge 602 to move up and down with respect to the rest of the HWC 102. Once the movable pin 608 aligns with a notch of the notched attachment 604, the two parts may engage to re-secure the nose bridge in the HWC 102.

In embodiments, a side arm of the HWC 102 may include an audio jack (not shown) and the audio jack may be magnetically attachable to the side arm. For example, the temple section 304 or ear horn section 308 may have a magnetically attachable audio jack with audio signal wires associated with an audio system in the HWC 102. The magnetic attachment may include one or more magnets on one end (e.g. on the head phone end or the side arm end) and magnetically conductive material on the other end. In other embodiments, both ends of the attachment may have magnets, of opposite polarization, to create a stronger magnetic bond for the headphone). In embodiments, the audio signal wires or magnetic connection may include a sensor circuit to detect when the headphone is detached from the HWC 102. This may be useful in situations where the wearer is wearing the headphones during a period when there is not constant audio processing (e.g. listening for people to talk with periods of silence). In embodiments, the other side's headphone may play a tone, sound, signal, etc. in the event a headphone is detached. In embodiments, an indication of the detachment may be displayed in the computer display.

In embodiments, the HWC 102 may have a vibration system that vibrates to alert the wearer of certain sensed conditions. In embodiments, the vibration system (e.g. an actuator that moves quickly to cause vibration in the HWC 102) may be mounted in a side arm (e.g. the temple section 304, or ear horn 308), in the top mount 312, etc. In embodiments, the vibration system may be capable of causing different vibration modes that may be indicative of different conditions. For example, the vibration system may include a multi-mode vibration system, piezo-electric vibration system, variable motor, etc., that can be regulated through computer input and a processor in the HWC 102 may send control signals to the vibration system to generate an appropriate vibration mode. In embodiments, the HWC 102 may be associated with other devices (e.g. through Bluetooth, WiFi, etc.) and the vibratory control signals may be associated with sensors associated with the other device. For example, the HWC 102 may be connected to a car through Bluetooth such that sensor(s) in the car can cause activation of a vibration mode for the vibration system. The car, for example, may determine that a risk of accident is present (e.g. risk of the driver falling asleep, car going out of its lane, a car in front of the wearer is stopped or slowing, radar in the car indicates a risk, etc.) and the car's system may then send a command, via the Bluetooth connection, to the HWC 102 to cause a vibratory tone to be initiated in the HWC102.

Another aspect of the present invention relates to a removable and replaceable speaker assembly for a HWC 102. There are times when different speaker types are desired or when a speaker may malfunction. It is therefore desirable to have a speaker assembly that is removable and replaceable by the user. To facilitate the removal and reattachment of the speaker assembly a magnetic or magnetic attachment system may be included. For example, the speaker assembly and head-worn computer may include magnetic elements such that the speaker can be removed by exerting pressure and replaced by getting the two sections close to one another. In another example, the speaker or head-worn computer may have a button, slider, etc. that can be interacted with to remove the speaker. In embodiments, the speaker assembly may have a form factor of an ear bud, ear phone, head phone, head set, external ear speaker, etc. In embodiments, the speaker assembly may include a vibratory system to provide haptic feedback to the user. In embodiments, such a removable and replaceable speaker system may be provided to both of the user's ears.

Figure 8:
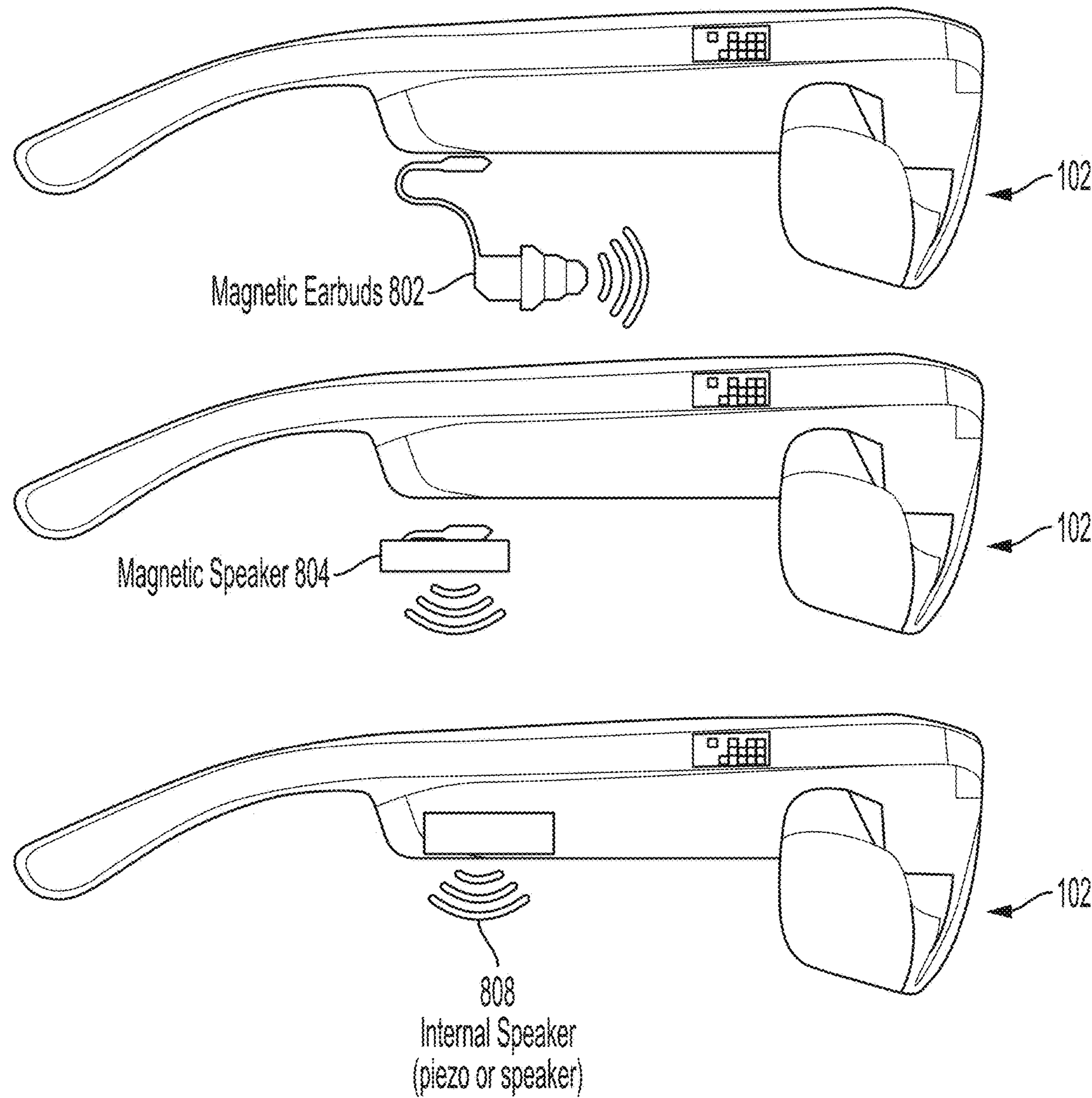
FIG. 8 illustrates speaker assemblies for head-worn computers in accordance with the principles of the present invention.

FIG. 8 illustrates several embodiments where HWC 102's are associated with speaker systems. Earbud 802 may be removably attached to the HWC 102 with a magnetic system or mechanical system or combination thereof. Speaker 804 may also be removably attached to the HWC102 in a similar way. The speaker 804 may be positioned to emit sound towards the user's ear but not actually be positioned in the ear. This configuration may provide for greater environmental hearing for the user as the ear would not be blocked by an ear bud, head phone, etc. The speaker 804 may generate audio waves and/or ultrasonic waves that are converted into audio when they are emitted through the air. When ultrasonic transducers are used, more than one frequency transducer may be included. See http://en.m.wikipedia.org/wiki/Sound from ultrasound and http://www.holosonics.com for references on generating sound from ultrasound. The speaker and/or piezo vibratory system 808 is depicted as integrated into the temple. In embodiments, this module may be integrated such that it can be removed and replaced and it may also be adapted such that it does not hang below the temple piece. Each of the removable and replaceable speaker systems described herein may include a vibratory system (e.g. piezo electric circuit that is controlled by the HWC 102.

In embodiments, a head-worn computer may include a temple portion mechanically secured to a computer display and adapted to position the computer display in front of an eye of a user, and the temple portion including a speaker attachment, wherein the speaker attachment is adapted to securely position a speaker assembly and electrically associate the speaker assembly with electronics internal to the head-worn computer and facilitate the user's release and re-securing of the speaker assembly with the temple portion. The speaker attachment may include a magnetic element, moveable mechanical element, etc. or combination thereof to secure and unsecure the speaker system from the HWC 102. The speaker assembly may have a form factor adapted to be inserted into an outer ear of the user, cover at least a portion of an outer ear of the user, cover substantially all of an outer ear of the user, to position the speaker under the temple assembly and above an ear of the user, to position a speaker under the temple assembly and in front of an ear of the user, angle the speaker towards the ear, etc. The speaker system may further have a vibratory system to provide haptic feedback to the user. The haptic feedback may be coordinated with a game being presented in the computer display, an application running on the HWC 102, etc. In embodiments, a vibratory system is provided in both speaker systems to provide controllable haptic feedback in stereo and/or on both or either side of the user's head.

In embodiments, the connection between the speaker system and the HWC 102 may be positioned other than under the temple section. It may be positioned on a side, top, bottom, end of a section of the side arm, for example. It may be positioned on the front bridge, for example. In embodiments, the speaker system may be connected to a top or side portion and the speaker may be further positioned to face forward, away from the user's ear. This may be a useful configuration for providing sound to others. For example, such a configuration may be used when the user wants to provide translations to a person nearby. The user may speak in a language, have the language translated, and then spoken through the forward facing speakers.

The removable nature of the speaker systems may be desirable for breakaway situations so a snag does not tear the glasses from the user or pull hard on the user's ear. The removable nature may also be useful for modularity configurations where the user wants to interchange speaker types or attach other accessories. For example, the user may want ear buds at one point and an open ear speaker configuration at another point and the user may be able to make the swap with ease given this configuration. The port on the HWC 102 may also be adapted for other accessories that include lights or sensors for example. The accessory may have an ambient light sensor to assist with the control of the lighting and contrast systems used in the HWC 102 displays, for example. In embodiments, the speaker port may be used as a charging port for the HWC 102 or data port for the HWC 102.

An aspect of the present invention relates to a language translation system with a head-worn computer. In embodiments, the head-worn computer includes a microphone and an audio communication system. The microphone is associated with a processor and is used to record a spoken utterance of a person wearing the head-worn computer. The microphone is positioned in the head-worn computer such that the person wearing the head-worn computer can speak in a normal tone and volume and the microphone will record the user's utterances. The head-worn system is further adapted to convert the spoken utterance into a language other than a first spoken language represented by the spoken utterance, forming translated language. For example, if the user is speaking in English, the recorded English spoken words will be recognized and converted into a second language (e.g. Spanish). The converted language can then be played in an audio system such that the converted language is played through an associated speaker system.

The speaker in the language translation system may be wired or wirelessly connected to the head-worn computer. The speaker also will be of sufficient size and power to produce sound intensity such that a person at a conversational distance can hear the sound at a conversational level. For example, the speaker may produce sound in a range of approximately 30 to 40 db at a distance of 5 feet from the speaker. This is a relatively quiet conversational sound intensity and may be used in a quiet sound level environment. The speaker may produce sound in a range of approximately 40 to 60 db at a distance of 5 feet from the speaker. This is a moderate sound level and may be used in a moderate sound level environment. The speaker may produce sound in a range of approximately 60 to 80 db at a distance from 5 feet of the speaker. This is a relatively loud sound level and may be used in a loud environment. The speaker may be powerful enough for a maximum level (e.g. 80 db) and the audio system may be controllable to a lower level (e.g. 30 db). In embodiments, the sound level from the speaker may be automatically regulated depending on the sound in the environment. In embodiments, the sound level may be manually regulated. A manually regulated system may be regulated through gesture control, an external user interface adapted to regulate aspects of the head-worn computer, a control mounted on the head-worn computer, etc. The manually regulated system may be regulated by a control on the speaker itself.

In embodiments, the speaker is adapted to be positioned separately from the head-worn computer at a spot where it can be secured mechanically but to cause the sound to emanate from a direction similar to the direction of the user's speech. For example, the speaker may be mechanically adapted to fit into a shirt pocket of the user. This at least partially conceals the speaker and secures it such that the sound comes from a similar direction as the user's speech. The speaker may be mechanically adapted to clip onto a shirt of the user or otherwise adapted to be properly positioned.

The head-worn computer may be further adapted to communicate the translated language to the speaker and display, in a see-through head-worn display mechanically supported by the head-worn computer, a visual representation of the first or second language. For example, the visual representation may be a representation of the original language converted based on the utterances such that the person wearing the head-worn computer can see, as a confirmation, the language that was the output of the conversion process. This can help to avoid miscommunications. In the event that the conversion process improperly converted the spoken language, the user would be able to correct the system because the visual representations would give him the indication of improper conversion. As another example, the visual display may represent the converted language. This may help the person wearing the head-worn computer learn the second language. It may also be useful in a situation where the user is trying to speak the second language and just wants help from the head-worn system from time to time. For example, the user may have the language conversion system off, and then turn it on when he finds himself lacking an understanding of how to say something in the second language. Once on, the conversion system can assist him by speaking the converted language to the other person and/or displaying the words or other representations in the see-through display.

In embodiments, the user may be able to turn the visual representation of the first or second language off. This user control may be helpful in a number of situations. For example, the user may want to rely on the conversion system and not want the additional distraction of the visual representations of the language presented in his field of view. This may be the case when the user needs to provide greater attention to the other person, situation or environment. The user control may be controlled by a gesture, external user interface, head-worn computer mounted user interface, etc. The user interface may also provide a visual representation of the user interface and/or the state of the user interface in the see-through display.

Another aspect of the language conversion system in the head-worn computer relates to the control of the audible tone of the second language produced through the speaker system. There may be situations where the use of a custom or predetermined audible tone may be useful. For example, if the audible tone from the speaker approximates the audible tone of the user himself than the system may produce a more personal situation between the user and the listener. For example, the translated language may have an audible spectrum based on the user's spoken utterances. The audible spectrum may be determined through an analysis of the spoken utterance's spectrum. The analysis may result in one of a plurality of pre-determined tones to be used when communicating the translated language to the speaker. For example, selected tone may be a high male tone, mid-tone male, low male tone, high female tone, mid-tone female, low female tone, etc. In embodiments, the user may manually select the tone.

In embodiments, the audible tone of the spoken utterances is analyzed and categorized by a signature, wherein the signature defines power within spectral ranges. The signature can then be used to modify the tone of the speaker system. For example, the signature may indicate that a high frequency range in the person's voice is not powerful so a spectral filter with a suppression of the range may be applied to the tone produced by the speaker system. A technique generally referred to as voice morphing may be used to approximate the user's voice. See the following published paper for additional information on voice morphing: Eng. Dept., Cambridge Univ., UK, DOI: 10.1109/ICASSP.2004.1325909 Conference: Acoustics, Speech, and Signal Processing, 2004. Proceedings. (ICASSP '04). IEEE International Conference on, Volume: 1.

Another aspect of the present invention relates to securing the head-worn computer 102 to the user's head in a way that the computer does not slip down the nose of the user, due to the extra front weight of the HWC 102, but does not create discomfort for the user. While some have designed systems that use lateral force between the two side arms to squeeze the HWC arms on the sides of the user's head, this solution tends to cause comfort problems. The squeeze on the user's head has to be relatively high, as compared to non-computer glasses, to maintain enough pressure to overcome the additional weight in the front of the glasses and this high pressure tends to cause comfort issues. In embodiments of the present invention, a substantially stiff ear horn is provided and the back end of the ear horn wraps around the user's head and touches the user's head. The touch point is towards the back of the user's head such that it provides a point or area of counteracting force for the HWC 102 if it tries to pull forward or down the user's nose due to the front weight of the HWC 102. In embodiments, the end of the ear horn, or a section near the end, has a touch pad. The touch pad may be made of soft material so it is comfortable on the back of the user's head. In embodiments, the touch pad may be mounted such that it has angular flexibility. The angular flexibility allows the touch pad to better align with the touch point on the user's head so it can provide the counteractive force but spread the force over an area for greater comfort.

In embodiments, a head-worn computer is provided and has a see-through computer display configured to be mounted on the head of a user; a side arm configured to secure the see-through computer display to the user's head, the side arm further configured to be positioned to lay against the user's head proximate an ear of the user; and the side arm including a stiff member extending behind the ear of the user, contoured to substantially follow a curvature of the user's head behind the ear of the user, and to touch a portion of the user's head towards the rear of the user's head such that the see-through computer display remains substantially secure in a position in front of an eye of the user.

In embodiments, the stiff member is removeably secured to a temple portion of the side arm (as described herein elsewhere). The stiff member may be telescopically adjustable to fit the user's head. The stiff member may be provided with a ratchet style securing mechanism for adjusting the telescopic adjustment. The stiff member may be provided with a rotatable style securing mechanism for adjusting the telescopic adjustment, or another style securing mechanism may be provided. The stiff member may touch a portion of the user's head at a rear end of the stiff member. The rear end of the stiff member may include a touch pad. The touch pad may be made of a soft material to increase the comfort and surface area of the touch area. The touch pad may be attached such that it has angular flexibility such that the touch pad changes position to increase a touch surface in contact with the rear of the user's head.

Figure 9:
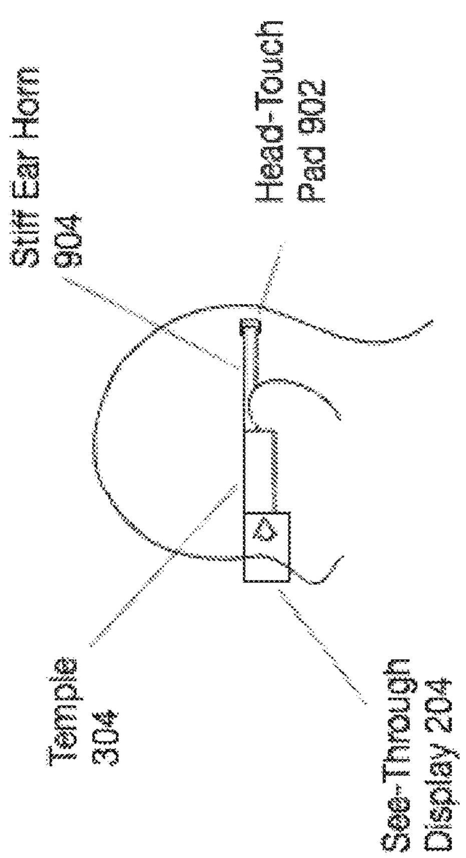
FIG. 9 illustrates a stiff ear horn with a touch pad for a head-worn computer in accordance with the principles of the present invention.

FIG. 9 illustrates a HWC 102 mounted on the head of a user. The HWC 102 has a see-through optics module 204, a temple portion 304, a stiff ear horn 904 and a head-touch pad 902. As described herein elsewhere, the stiff ear horn 904 may be removable and replaceable. This can be useful when the exchange of ear horns from one type to another or one size to another is desired, for example. The stiff ear horn 904 may be made of aluminum, aluminum tubing, carbon fiber, or other material that is relatively stiff. The stiffness should be of a level that provides for lateral inflexibility such that the touch pad 902 can exert counteracting force with a high rear facing vector. Too much flexibility in the stiff ear horn 904 can detract from the rear-facing vector of force when the weight of the HWC 102 is pulling forward/down the nose. In embodiments, several different lengths, shapes, stiffnesses, etc. of stiff ear horn 904 may be provided so the user can select the set that best serves his purpose. The head-touch pad 902 may be made of a soft material, malleable material, etc. to provide comfort to the user and to increase the head touch surface. The head-touch pad 902 may also be mounted in such a way that the head-touch pad 902 can flex and/or change angle as it is pressed upon. The head-touch pad 902 may, for example, be mounted on the stiff ear horn 904 with a hinge or pivot mechanism such that the head-touch pad 902 self aligns with the user's head when the HWC 102 is put on the user's head. This configuration may increase the touch surface area between the head-touch pad 902 and the user's head and generate a larger counteracting force to prevent the slipping or moving of the HWC 102.

In embodiments, the side arms of the HWC 102 are designed to exert inward lateral pressure on the user's head, but the lateral pressure is reduced so it is not uncomfortable, along with having stiff side arms 904 and head-touch pads 902. In these embodiments, the ear horns 904 and head touch pads 902 cause significant counteracting forces in addition to the counteracting forces applied through the inward lateral forces applied by the side arms.

Another aspect of the present invention relates to the thermal management of the head-worn computer. In embodiments, the head-worn computer is a high functioning self-contained computer with wireless connectivity where the electronics are compacted to fit into a glasses style form factor. In embodiments, the main heat producing electronics are in an upper portion of a bridge section over the top of the lenses of the head-worn computer (e.g. as described in connection with FIG. 3B). The thermal management technologies described herein manage the heat such that the system can operate in high temperature environments (e.g. 55 degrees C. ambient) and maintain a comfortable temperature for the user (e.g. below 70 degrees C. along the forehead section).

FIG. 3B illustrates an embodiment of a head-worn computer wherein the electronics are housed in an upper bridge section above the lenses of the glasses form factor. This has been referred to as the top mount 312. The top mount 312 may include the majority of the electronics that are used to form the fully functional computer. This may include the processor, memory, sensors, cameras, optical drive system, etc. In this embodiment, the batteries are housed in the temple portions of the side arms. The top mount 312 may include a cavity where the circuit board(s) are housed and secured. The top mount may also include a top plate 1000 designed to be mounted on the top of the cavity such that it forms a portion of the enclosure. In embodiments, the top plate 1000 is designed to receive heat from the circuit board and/or components mounted on the circuit board and then dissipate the heat into the environment surrounding the head-worn computer.

Figure 10:
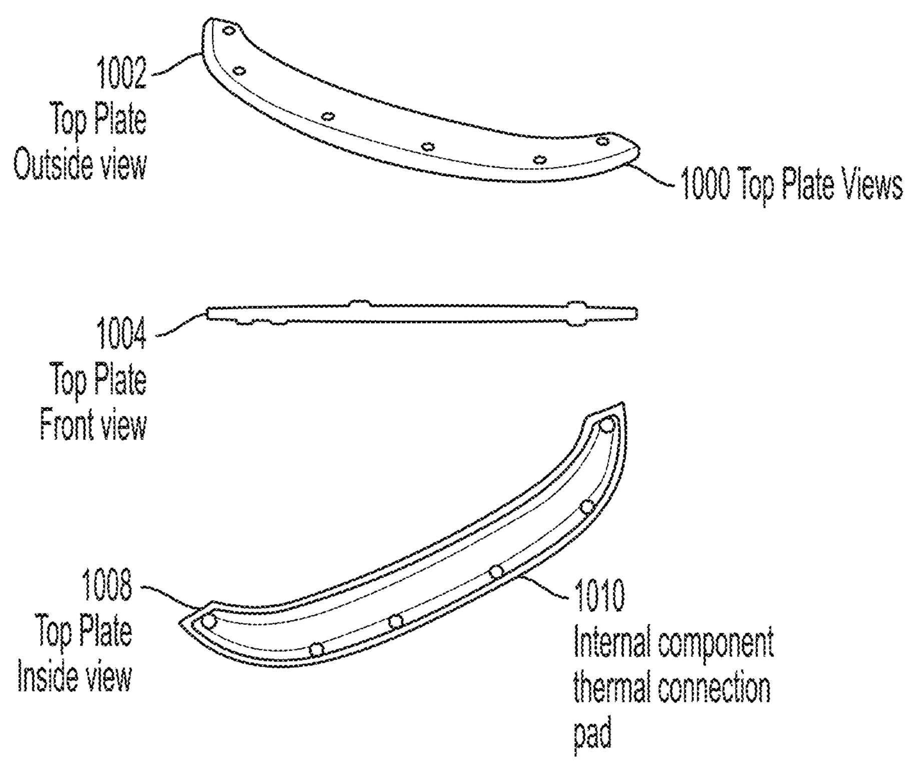
FIG. 10 illustrates a top plate in accordance with the principles of the present invention.

FIG. 10 illustrates several perspective views of an embodiment top plate 1000. The top plate outside view 1002 illustrates the heat dissipating fins on the top of the top plate 1002. The heat dissipating fins are on the outside of the completed head-worn computer assembly and dissipate the heat into the surrounding environment. The top plate front view 1004 illustrates a front perspective of the top plate. The top plate inside view 1008 illustrates a bottom view of the top plate. The bottom is the portion that is on the inside of the circuit board cavity in the fully assembled head-worn computer. The bottom of the top plate 1000 may have features to facilitate the mechanical and thermal connection with the circuit board and/or components on the circuit board. For example, in the embodiment illustrated in FIG. 10 the top plate 1000 includes an internal component thermal connection pad 1010. The thermal connection pad 1010 may be adapted to mechanically and thermally connect with the internal circuit board and/or a component on the circuit board (e.g. the processor, memory, or other heat producing component). The assembly may have intervening material between the top plate 1000 and the circuit board and/or circuit board component (e.g. a heat spreader plate designed to receive heat from a component or set of components and then spread the heat over an area, thermally conductive paste, glue, pad, or other facilitating material). In embodiments, a thermally conductive material is placed between the circuit board and/or circuit board component(s) and the thermal connection pad 1010 of the top plate 1000 to eliminate any air gap that might otherwise develop as a result of the mechanical mismatch of the components in the assembly. This can further facilitate the transfer of heat from the heat producing component(s) (e.g. the processor) to the thermal connection pad 1010 and out to the surrounding environment through the heat dissipating fins. The inventors used a thermally conductive material from Fujupoly in the thermally tested devices. This material has an advertised thermal conductivity of 11 Watt/m-k. Watt/m-k is a unit of measurement of thermal efficiency for thermal interface material.

Figure 11:
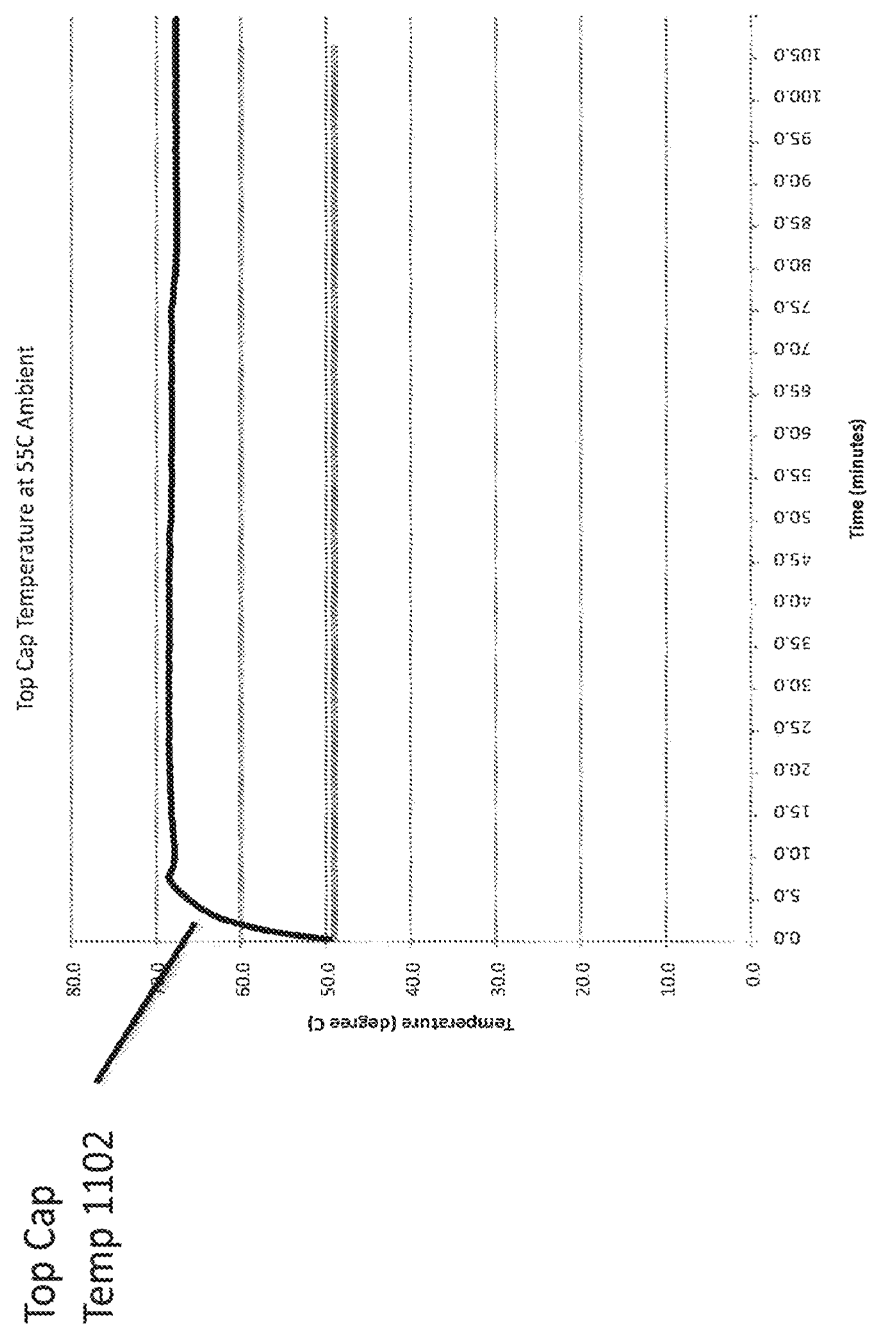
FIG. 11 illustrates temperature test results of an embodiment of the present invention.

FIG. 11 illustrates some test results relating to a head-worn computer with a top plate 1000 assembly as described herein. The head-worn computer was placed in an environmental chamber at 55 degrees Celsius. The head-worn computer was then turned on and the top plate 1000 temperature was observed. Operation of the processor was also observed. As can be seen, the maximum temperature of the top plate 1000 remained below 70 degrees Celsius. While 70 degrees Celsius is still a fairly hot maximum temperature, the heat dissipating fins caused the assembly to be comfortable to the human touch. In addition to maintaining an acceptable outside assembly temperature, the processor continued to operate throughout the testing, which is a significant advantage over the state of the art.

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC.

All documents referenced herein are hereby incorporated by reference.

I claim:

1. A language translation system, comprising:
- one or more processors;
- a wearable head device including a microphone system and a see-through display, the wearable head device in communication with the one or more processors;
- a speaker in communication with the one or more processors; and
- wherein the one or more processors are adapted to:
  - receive a spoken utterance of a person wearing the wearable head device,
  - convert the spoken utterance into a language other than a first spoken language represented by the spoken utterance, forming translated language,
  - communicate the translated language to the speaker, and
  - display a visual representation of the translated language via the see-through display.

2. The language translation system of claim 1, wherein the one or more processors are adapted to communicate to the speaker via a wired connection.

3. The language translation system of claim 1, wherein the one or more processors are adapted to wirelessly communicate to the speaker.

4. The language translation system of claim 1, wherein the speaker produces sound of less than 40 db at a distance of 5 feet from the speaker.

5. The language translation system of claim 1, wherein the speaker produces sound of less than 60 db at a distance of 5 feet from the speaker.

6. The language translation system of claim 1, wherein the speaker produces sound of less than 80 db at a distance of 5 feet from the speaker.

7. The language translation system of claim 1, wherein the translated language has an audible spectrum based on the spoken utterance of the person wearing the wearable head device.

8. The language translation system of claim 7, wherein the audible spectrum is determined through an analysis of a spoken utterance spectrum, wherein the analysis results in one of a plurality of tones to be used when communicating the translated language to the speaker.

9. The language translation system of claim 8, wherein the one tone is at least one of a high male tone, a mid-tone male, a low male tone, a high female tone, a mid-tone female, or a low female tone.

10. The language translation system of claim 1, wherein the speaker is mechanically adapted to fit into a shirt pocket of the person wearing the wearable head device.

11. The language translation system of claim 1, wherein the speaker is mechanically adapted to clip onto a shirt of the person wearing the wearable head device.

12. The language translation system of claim 1, wherein the one or more processors are configured to present a user interface that turns off the displaying of the visual representation of the translated language.

13. The language translation system of claim 1, wherein the one or more processors are configured to present a user interface that displays a visual representation of the first spoken language, and switch between a visual representation of the first spoken language and the translated language.

* * * * *